United States Patent [19]

Ainsbury et al.

[11] Patent Number: 6,078,924
[45] Date of Patent: Jun. 20, 2000

[54] METHOD AND APPARATUS FOR PERFORMING DATA COLLECTION, INTERPRETATION AND ANALYSIS, IN AN INFORMATION PLATFORM

[75] Inventors: Robert D. Ainsbury, San Francisco; Hussein K. Al Hussein, Santa Clara; Michael C. Hinnant, Foster City; Muwaffaq M. Lahham, San Francisco; Stephen L. Ludin, San Rafael; Daniel S. Putterman, San Francisco; Frederick R. Shotton, Hercules; Wilfredo M. Tejada, Portola Valley, all of Calif.

[73] Assignee: Aeneid Corporation, San Francisco, Calif.

[21] Appl. No.: 09/016,758

[22] Filed: Jan. 30, 1998

[51] Int. Cl.$^7$ ..................................................... G06F 17/00
[52] U.S. Cl. ............................................. 707/101; 707/102
[58] Field of Search ........................... 709/300; 382/103, 382/173; 707/1, 2, 3, 5, 103, 104, 200, 500, 101, 102

[56] References Cited

U.S. PATENT DOCUMENTS

| | | | |
|---|---|---|---|
| 5,361,353 | 11/1994 | Carr et al. | 709/300 |
| 5,608,907 | 3/1997 | Fehskens et al. | 707/1 |
| 5,633,946 | 5/1997 | Lachinski et al. | 382/103 |
| 5,732,264 | 3/1998 | Tanaka | 707/104 |
| 5,787,437 | 7/1998 | Potterveld et al. | 707/103 |
| 5,832,496 | 11/1998 | Anand et al. | 707/102 |
| 5,832,497 | 11/1998 | Taylor | 707/104 |
| 5,848,184 | 12/1998 | Taylor et al. | 382/173 |
| 5,870,741 | 2/1999 | Kawabe et al. | 707/5 |
| 5,870,746 | 2/1999 | Knutson et al. | 707/101 |
| 5,907,837 | 5/1999 | Ferrel et al. | 707/3 |
| 5,909,688 | 6/1999 | Yoshioka et al. | 707/200 |
| 5,913,205 | 6/1999 | Jain et al. | 707/2 |
| 5,918,236 | 6/1999 | Wical | 707/500 |

FOREIGN PATENT DOCUMENTS

| | | | |
|---|---|---|---|
| WO96/23265 | 8/1996 | WIPO | G06F 17/30 |
| WO97/15018 | 4/1997 | WIPO | G06F 17/30 |

OTHER PUBLICATIONS

Ashish et al., *Semi–Automatic Wrapper Generation for Internet Information Sources*, 1997, Information Sciences Institute and Department of Computer Science.

*Primary Examiner*—Wayne Amsbury
*Assistant Examiner*—Thuy Pardo
*Attorney, Agent, or Firm*—Michael A. Glenn; Christopher Peil

[57] ABSTRACT

An information platform automates the collection of data, provides a method for organizing the library of information and provides analysis using multiple content-types, thereby providing a user with a market understanding necessary to execute rapid and knowledgeable decision making. The information platform collects and integrates data, observations and intelligence; provides controls for multiple methods of information navigation and analysis; and allows details to be digested in the context of other data, regardless of its type. The information platform is a client/server implementation that is subdivided into four major sections, including: (1) Data Retrieval, which provides a sophisticated catalog for finding internal and external information and collection agents which retrieve specific information without user intervention; (2) Data Classification and Storage which handles the storage of the information once it has been gathered from a source; (3) Information Browsing, Query, Analysis, and Report Creation which provides information browsing, reporting, and analysis tools; and (4) Desktop Integration where the information platform takes information from a wide variety of formats (HTML, text, spreadsheet) and combines them all into a single format (HTML, text, spreadsheet).

11 Claims, 10 Drawing Sheets

METHOD AND APPARATUS FOR PERFORMING DATA COLLECTION, INTERPRETATION AND ANALYSIS, IN AN INFORMATION PLATFORM

BACKGROUND OF THE INVENTION

1. Technical Field

The invention relates to information management and navigation. More particularly, the invention relates to an information platform that collects and integrates data, observations, and intelligence; provides controls for multiple methods of information navigation and analysis; and allows details to be digested in the context of other data, regardless of its type.

2. Description of the Prior Art

Regardless of their specific job title, knowledge workers in the high-technology and financial service industries perform research and analysis function every day. Their work requires navigation between different types of information, from stock quotes, market capital, product comparisons, and industry commentary to internal sales figures and quotas. The decision making process for such knowledge workers is compounded by the fact that vital market information exists in widely dispersed locations and in many varied formats. Furthermore, when the research is complete, there is a high probability that a significant piece of data was overlooked.

The following examples illustrate these issues:

A research analyst from a large investment bank must make an investment recommendation for a specific company. The analyst must determine how the company's stock might perform in relation to the market, as well as its competitors. The analyst must determine the industry perception of the company and its products, in conjunction with the possibilities for future product launches. The analyst must also understand what other financial analysts are forecasting for this company's future stock, and the markets overall trend.

A VP of marketing must decide what new features to implement in an established software product in light of competitive threats and a raft of emerging technologies. The VP must determine the relevance of the emerging technologies, assess competitive activities, document consumer response to similar product initiatives, and review analyst predictions. The new plan must determine a prior plan's effectiveness by comparing internal initiatives with media coverage during the following months.

An executive team wants to compare the company's productivity with that of the competition. The team must research revenues and expenses within specific departments, identify sales per employee, and unit costs and compare them with the top five competitors.

Like a maze with doors and hallways, analysis may require a return trip backward through historical information with each new finding or insight. The traversing of isolated information, from paper reports, to internal databases to external Internet news sources and back to a Microsoft Excel spreadsheet is arduous and requires significant time investment.

H. Pajak, Electronic Library, European Patent Application No. 472070 (filed Aug. 9, 1991) discloses an electronic library metaphor on a computer workstation that includes shared books with data base metaphor, a reference books metaphor, and a card catalog metaphor in one system that allows large object oriented data base be organized and accessed in an exclusive environment and that allows access to screen icons, creates a visual hierarchy of related and shared objects, and allows mutually exclusive access to the metaphors within the library.

S -Y Hsu, Process For Identifying Simple and Complex Objects From Fused Images And Map Data, U.S. Pat. No. 5,631,970 (May 20, 1997) discloses a method of identifying and/or extracting an object from multiple fused information sources, such as amps and images. The systems allows a user to integrate information freely from multiple sources, such as maps, socioeconomic data, and various types of images. Data is first retrieved and then processed to transform its pixel representation to a region representation. The region representation is then refined by merging mechanisms, such as segmentation. The identified and/or extracted object can then be visualized by the user. Features or objects can then be extracted using the user's expert rules and confidence levels, which confidence levels may be derived by fuzzy logic.

An Information Retrieval System, European Patent Application No. 774722 (filed Nov. 15, 1996) provides a system in which design and content are separated. In this system, an information retrieval server (IR) indexes and searches stories in titles. INdexing takes place when a title is released to the network by a publisher workstation. The IR server inter-relates title, section, and story objects by their globally unique identifiers and creates a routing table which is used to located objects across multiple database partitions. The IR search service is requested in two different way at customer runtime. The first way is the resolution of the search objects to retrieve matching stories. The retrieved stories are concatenated and poured into the area defined by the dynamic control when the title is viewed. In the second way, the IR search service is requested when a search is initiated by a customer using a "find" dialog to search across all stories in one or more titles, both dynamic and static.

It would be advantageous to provide an application that automated the collection of data, provided a method for organizing the library of information and provided analysis using multiple content-types, and thereby provide a market understanding necessary to execute rapid and knowledgeable decision-making.

SUMMARY OF THE INVENTION

The invention provides information platform that automates the collection of data, provides a method for organizing the library of information and provides analysis using multiple content-types, thereby providing user with a market understanding necessary to execute rapid and knowledgeable decision-making.

The information platform is a combination of desktop and server technologies that raise the decision making abilities of business professionals to the highest possible level.

The information platform:

Collects and integrates data, observations and intelligence;

Provides controls for multiple methods of information navigation and analysis;

Allows details to be digested in the context of other data, regardless of its type.

The information platform is a client/server implementation that is subdivided into four major sections.

Section 1—Data Retrieval.

The entire information platform relies upon reliable, predictable access to data, regardless data source. The data retrieval section of the platform provides a sophisticated catalog for finding internal and external information. It provides collection agents, which retrieve specific information without user intervention. The information platform provides users with multiple ways for collecting vast amounts and varied types of information in the shortest time possible.

Using the invention, there are several approaches a user can adopt for collecting information:

The user can comb a data source catalog, looking for a specific nugget(s) of information, such as the names of companies selling virus-protection software. Collection profiles can gather bodies of information with minimal input. A user, for example, enters a single company name, and the information platform gathers financial, organizational, product and manufacturing information about the company and its competitors. If the information is not available in the catalog, the user can find the information using traditional means (such as a search engine, or by combing through files on the network, browsing) and the information platform can automatically add the new information source to the catalog. An analysis template guides a user through the data collection, interpretation and analysis process for a specific topic, e.g. a template comparing the effectiveness of corporate communications on press coverage. By selecting an analysis template, the user is walked through the data collection cycle.

A user analyzing data in Excel wants to add an additional row to a grid. By extending the Microsoft Office suite with the information platform menus and buttons, a user browses, selects and imports information using the catalog from within the desktop application.

The control center for the information collection is the catalog. The catalog contains details about how to access and retrieve data located throughout e.g. the Internet, as well as knowledge for collecting information from major market research companies, such as Gartner Group, Dun and Bradstreet, and AdScope. A corporation can quickly add all internal data sources to the catalog, providing a user with a one-stop place to pull information from internal and external sources. Similarly, a user can add external information sources, create or modify collection profiles, and customize the catalog. Any catalog can receive updates from the master catalog via the Internet.

There are two core technologies that make the catalog superior to traditional indexes and contents lists.

First, the information platform provides a document analyzer that can reliably extract individual elements from any document type, even when the document is unstructured. This allows the catalog to contain a much greater level of detail than a simple document catalog. For example, the Securities Exchange Commission I0Q Report (Source: EDGAR database) contains more than 100 elements, each can be individually retrieved and processed. Using the catalog, a user finds that they can retrieve operating expenses for Research and Development from the I0Q, something they might not have realized was buried in the EDGAR SEC filings.

Second, the catalog is built upon an object-oriented database, referred to as a 'store.' The object-oriented store, used in conjunction with a rich set of classifications for each information source, provides unprecedented flexibility for catalog navigation. Users can find an information source using a variety of different navigation paths.

A scripting engine works in conjunction with the catalog to automate repeated information retrieval from internal and external sources. Having captured a nugget of information once, the information platform returns to the location repeatedly retrieving updated information without user interaction.

Section 2—Data Classification and Storage.

The second section of the application platform handles the storage of the information once it has been gathered from a source. As with the data source catalog, the information store uses an object-oriented database and exhibits the same flexible access behaviors, i.e. users can navigate the store and find information using a variety of navigation paths.

Whenever a user pulls data from a source the data is tagged, metadata attributes are assigned, and the data is saved in the store.

There are many benefits to maintaining an information store:

Information can be retrieved once and used multiple times—reducing access and subscription fees, connection time and network traffic. The information platform automatically gathers information updates and stores them without client intervention—data are always updated and historically tracked.

The store maintains a growing base of information—the system becomes increasingly valuable over time. The store manages complex relationships between information elements—allowing for sophisticated comparisons and context when viewing data.

Information about the origin of the data is permanently recorded—data are always associated with an author, organization or other source. Data are volatile and may not be permanently accessible from the source—long after the original source of the information has expired, the user can access the information from the store. The store allows unique time dimensions to be applied to both structured and unstructured information—items are always historically monitored. Custom data visualization controls can be developed because the information is retrievable in a consistent way—allowing for cross-analysis of multiple information types.

Key to a valuable information store is the assignment of quality metadata to the individual information elements. Metadata are sets of specific details about data, similar to an abstract of a library book. The metadata falls into two major categories:

Base information about the specific information element (from where it was obtained, the data format); and The relationship of the information to other information in the store.

Relationships are classified according to business-specific taxonomies. 'Number of Employees,' for example, is classified in relation to a year, a company, a market, and the number's source. Because the store already has a relationship between a company and operating expenses, the information platform can construct a derivative relationship and report 'employee numbers' as related to a company's 'net income' for a certain 'year.'

Although metadata is the lifeblood of a complex data store, it is important that the burden of metadata assignment does not rest solely with the user. The information platform uses a variety of methods of automatically assigning metadata. The first source of metadata is the data source catalog, which contains a wealth of metadata about known information sources. The invention gathers the majority of metadata from the data source catalog and automatically assigns classifications to new pieces of information as they are collected. Another way of automatically assigning metadata is by analyzing the information content. Also, the source of the information, the individual who requested the collection and the data format (e.g. HTML, Excel) is automatically assigned.

Section 3—Information Browsing, Query, Analysis, and Report Creation.

Because all the structured and unstructured information from internal and external sources (captured over time) is collected in a consistent object-oriented store, the information platform can provide unprecedented information browsing, reporting, and analysis tools.

One embodiment of the invention provides a set of pre-built interfaces between the object store and the desktop. These preconfigured interfaces provide users with the opportunity to browse, query, and graph multiple types of information.

A user can choose one of the following ways to peruse and analyze information in the store:

A user can navigate the store by roaming through different topics and subtopics. Information can be accessed in many ways, using varied pathways. Information on a trade show, for example, can be accessed from an Events section, or by selecting a product, then the product's company, and then seeing at which trade shows the company exhibits it products (or is scheduled to exhibit its products).

A sophisticated search engine provides a quick way to find individual information nuggets without having to navigate the store.

Quick Reports provide instant analysis (often in graphical form) of a specific topic. Quick reports compare, for example, companies advertising expenditures and gross sales revenue. The information platform knows what information to retrieve from the store and how to display it. These quick reports are similar to Quicken reports, which take checkbook transactions and display interesting trends and facts gleaned from the source data.

Information Visualization Controls provide unique ways to view multiple data elements in a single control.

Analysis templates extend the notion of Quick Reports and provide a framework for analysis on a specific topic. The template includes a 'Score Card' guideline for tracking information (such as revenue numbers and sales figures) that must be gathered for complete analysis. Other templates include a collection of graphs and tables that are germane to the analysis, and skeleton Microsoft Office documents which provide the final report framework.

The information platform client takes advantage of the latest Microsoft Explorer technologies and uses a combination of Java, JavaScript, ActiveX, and dynamic HTML to provide a sophisticated information delivery platform.

Section 4—Desktop Integration.

Rather than compete with major desktop analysis and reporting tools (such as Excel and Word), the information platform exports data to these standard applications for ease of use. The information platform takes information from a wide variety of formats (HTML, text, spreadsheet) and combines them all into a single format (HTML, text, spreadsheet).

Information provided on the user desktop can be saved in all of the standard Office file formats (such as Word, Excel, Access, and PowerPoint), and text or HTML files. Information can also be 'pushed' into an Active Desktop applications using OLE automation.

DETAILED DESCRIPTION OF THE INVENTION

The herein disclosed information platform is a combination of desktop and server technologies that raise the decision making abilities of business professionals to the highest possible level.

The information platform:
collects and integrates data, observations and intelligence;
provides controls for multiple methods of information navigation and analysis;
allows details to be digested in the context of other data, regardless of its type.

Some of the benefits of invention include decreased time spent searching, collecting, integrating, analyzing, and reporting information. The platform provides the widest coverage of data sources and eliminates 'Information isolation'—expensive, yet useless, information that is never analyzed in conjunction with other internal and external data sources.

Figure 1:
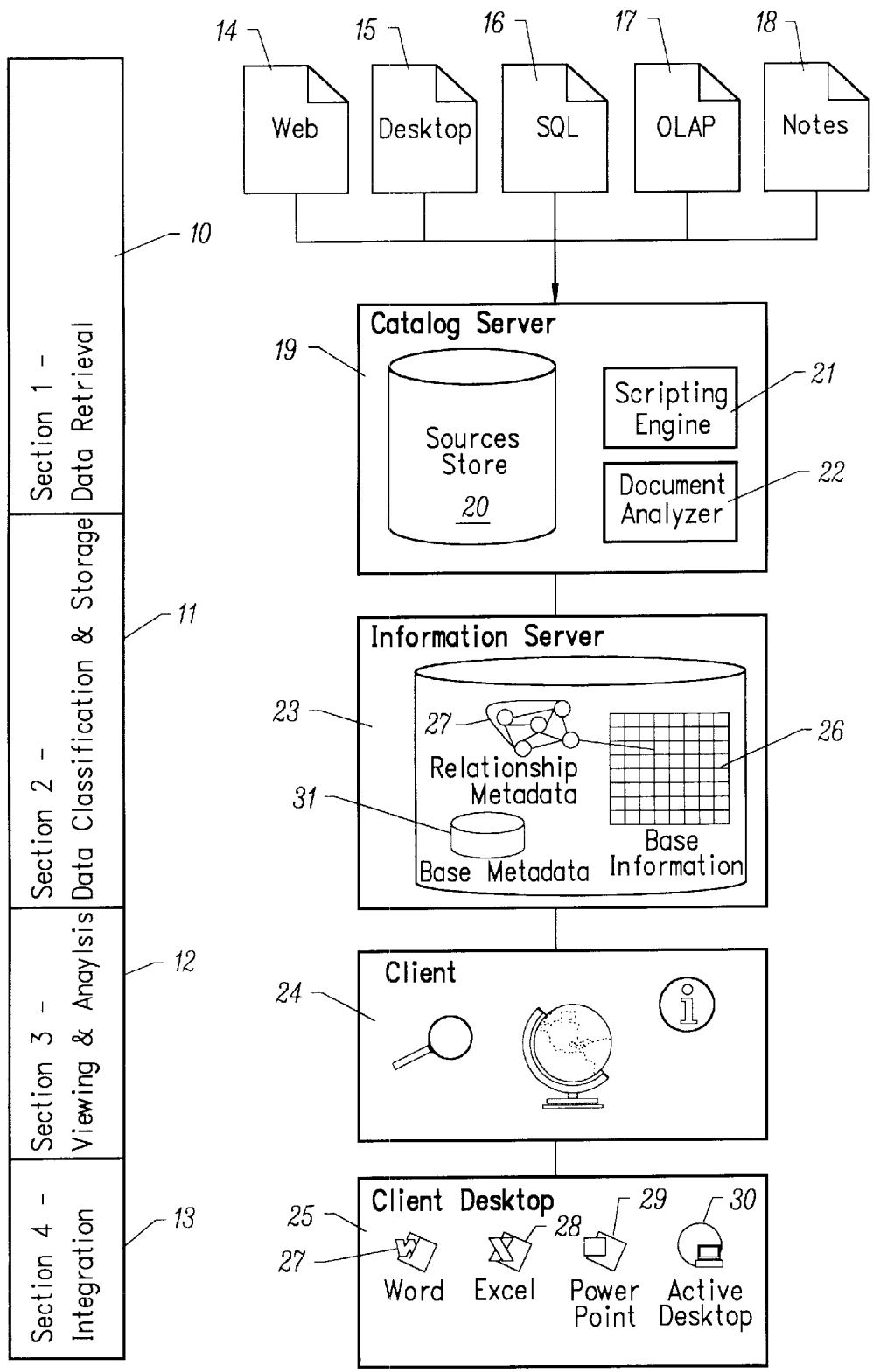
FIG. 1 is a block diagram of the architecture of an information platform according to the invention.

The information platform is a client/server implementation that is subdivided into four major sections, as illustrated on FIG. 1.

Section 1 (10)—Data Retrieval.

The entire information platform relies upon reliable, predictable access to data, regardless data source. The data retrieval section of the platform provides a sophisticated catalog 19 for finding internal and external information. It provides collection agents, which retrieve specific information without user intervention. The information platform provides users with multiple ways for collecting vast amounts and varied types of information in the shortest time possible.

Using the invention, there are several approaches a user can adopt for collecting information:

The user can comb a data source catalog, looking for a specific nugget(s) of information, such as the names of companies selling virus-protection software. Collection profiles can gather bodies of information with minimal input. A user, for example, enters a single company name, and the information platform gathers financial, organizational, product and manufacturing information about the company and its competitors. If the information is not available in the catalog, the user can find the information using traditional means (such as a search engine, or by combing through files on the network, browsing) and the information platform can automatically add the new information source to the catalog. An analysis template guides a user through the data collection, interpretation and analysis process for a specific topic, e.g. a template comparing the effectiveness of corporate communications on press coverage. By selecting an analysis template, the user is walked through the data collection cycle.

A user analyzing data in Excel wants to add an additional row to a grid. By extending the Microsoft Office suite with the information platform menus and buttons, a user browses, selects and imports information using the catalog from within the desktop application.

The control center for the information collection is the catalog 19. The catalog contains details about how to access and retrieve data located throughout e.g. the Internet, as well as knowledge for collecting information from major market research companies, such as Gartner Group, Dun and Bradstreet, and AdScope. A corporation can quickly add all internal data sources to the catalog, providing a user with a one-stop place to pull information from internal and external sources. Similarly, a user can add external information sources, create or modify collection profiles, and customize the catalog. Any catalog can receive updates from the master catalog via the Internet.

There are two core technologies that make the catalog superior to traditional indexes and contents lists.

First, the information platform provides a document analyzer 22 that can reliably extract individual elements from any document type, even when the document is unstructured. This allows the catalog to contain a much greater level of detail than a simple document catalog. Thus, source documents may be obtained from the World Wide Web (web) 14, a user desktop 15, an SQL query to a database 16, an OLAP query 17, or from Lotus Notes 18. For example, the Securities Exchange Commission I0Q Report (Source: EDGAR database) contains more than 100 elements, each can be individually retrieved and processed. Using the catalog, a user finds that they can retrieve operating expenses for Research and Development from the I0q, something they might not have realized was buried in the EDGAR SEC filings. Second, the catalog is built upon an object-oriented database, referred to as a 'store' 20. The object-oriented store, used in conjunction with a rich set of classifications for each information source, provides unprecedented flexibility for catalog navigation. Users can find an information source using a variety of different navigation paths.

A scripting engine 21 works in conjunction with the catalog to automate repeated information retrieval from internal and external sources. Having captured a nugget of information once, the information platform returns to the location repeatedly retrieving updated information without user interaction.

Section 2 (11)—Data Classification and Storage.

The second section of the application platform handles the storage of the information once it has been gathered from a source. As with the data source catalog, the information store 23 uses an object-oriented database and exhibits the same flexible access behaviors, ie. users can navigate the store and find information using a variety of navigation paths.

Whenever a user pulls data from a source the data is tagged, metadata attributes are assigned, and the data is saved in the store.

There are many benefits to maintaining an information store:

Information can be retrieved once and used multiple times—reducing access and subscription fees, connection time and network traffic. The information platform automatically gathers information updates and stores them without client intervention—data are always updated and historically tracked.

The store maintains a growing base of information—the system becomes increasingly valuable over time. The store manages complex relationships between information elements—allowing for sophisticated comparisons and context when viewing data.

Information about the origin of the data is permanently recorded—data are always associated with an author, organization or other source. Data are volatile and may not be permanently accessible from the source—long after the original source of the information has expired, the user can access the information from the store. The store allows unique time dimensions to be applied to both structured and unstructured information—items are always historically monitored. Custom data visualization controls can be developed because the information is retrievable in a consistent way—allowing for cross-analysis of multiple information types.

The key to a valuable information store is the assignment of quality metadata to the individual information elements. Metadata are sets of specific details about data, similar to an abstract of a library book. The metadata falls into two major categories:

Base information 26 about the specific information element (from where it was obtained, the data format); and The relationship 27 of the information to other information in the store.

Relationships are classified according to business-specific taxonomies. 'Number of Employees,' for example, is classified in relation to a year, a company, a market, and the numbers source. Because the store already has a relationship between a company and operating expenses, the information platform can construct a derivative relationship and report 'employee numbers' as related to a company's 'net income' for a certain 'year.'

Although metadata is the lifeblood of a complex data store, it is important that the burden of metadata assignment does not rest solely with the user. The information platform uses a variety of methods of automatically assigning metadata. The first source of metadata is the data source catalog, which contains a wealth of metadata about known information sources. The invention gathers the majority of metadata from the data source catalog and automatically assigns classifications to new pieces of information as they are collected. Another way of automatically assigning metadata is by analyzing the information content. Also, the source of the information, the individual who requested the collection and the data format (e.g. HTML, Excel) is automatically assigned.

Section 3 (12)—Information Browsing, Query, Analysis, and Report Creation.

Because all the structured and unstructured information from internal and external sources (captured over time) is collected in a consistent object-oriented store, the information platform can provide unprecedented information browsing, reporting, and analysis tools.

One embodiment of the invention provides a set of pre-built interfaces between the object store and the desktop. These preconfigured interfaces provide users with the opportunity to browse, query, and graph multiple types of information.

A user 24 can choose one of the following ways to peruse and analyze information in the store:

A user can navigate the store by roaming through different topics and subtopics. Information can be accessed in many ways, using varied pathways. Information on a trade show, for example, can be accessed from an Events section, or by selecting a product, then the product's company, and then seeing at which trade shows the company exhibits it products (or is scheduled to exhibit its products).

A sophisticated search engine provides a quick way to find individual information nuggets without having to navigate the store.

Quick Reports provide instant analysis (often in graphical form) of a specific topic. Quick reports compare, for example, companies advertising expenditures and gross sales revenue. The information platform knows what information to retrieve from the store and how to display it. These quick reports are similar to Quicken reports, which take checkbook transactions and display interesting trends and facts gleaned from the source data.

Information Visualization Controls provide unique ways to view multiple data elements in a single control.

Analysis templates extend the notion of Quick Reports and provide a framework for analysis on a specific topic. The template includes a 'Score Card' guideline for tracking information (such as revenue numbers and sales figures) that must be gathered for complete analysis. Other templates include a collection of graphs and tables that are germane to the analysis, and skeleton Microsoft Office documents which provide the final report framework.

Active Desktop users can instruct the information platform to push information, using Microsoft's Channel Definition Format (CDF), to an active desktop.

The information platform client takes advantage the latest Microsoft Explorer technologies and uses a combination of Java, JavaScript, ActiveX, and dynamic HTML to provide a sophisticated information delivery platform.

Section 4 (13)—Desktop Integration.

Rather than compete with major desktop analysis and reporting tools (such as Excel and Word), the information platform exports data to these standard applications for ease of use. The information platform takes information from a wide variety of formats (HTML, text, spreadsheet) and combines them all into a single format (HTML, text, spreadsheet).

Information provided on the user desktop 25 can be saved in all of the standard Office file formats (such as Word 27, Excel 28, Access, and PowerPoint) 29, and text or HTML files. Information can also be 'pushed' into an Active Desktop 30 applications using OLE automation.

All of the visualization controls can be embedded directly into Office applications, providing the user with the flexibility to develop custom templates.

Core technologies

Document Analyzer 22.

A major step in building a data store filled with inter-related objects from multiple locations, begins by collecting information from relevant sources. However, web pages, documents, and database outputs are too large to be classified accurately with a high degree of confidence and specification. The information platform provides a geometry recognition technology that analyzes multiple sources and recognize particular patterns within each site. A page analyzer scans a source document, e.g. a SEC 10K fiscal-year—revenue filing, and breaks it into blocks and sub-blocks of information, returning the granular pieces for aggregation in the data store 20. With the 10K filing, the page analyzer separates different data types, such as net income, expenses, products lists, company descriptions, and commentary about profits and losses. The page analyzer can recognize and break down input, for example, from HTML pages, text documents, charts, tables, Excel spreadsheets.

Metadata implementation.

Once data are located and dissected into its constituent parts, A subsystem classifies the data according to business-specific language. The classification allows for the data to be archived and tracked in an object store, similar to a book in a library. More importantly, the classification allows the object store to manage complex relationships between thousands of items. Once classified, an item is associated to several other data types by time, company name, revenue, product, product manager, and age, for example. The management of complex relationships allows the system and the user to find and inspect data through multiple paths. One benefit of maintaining data inter-relationships is the speed with which a particular fact, statistic, or analyst quote can be located and referenced.

The classification subsystem uses object-oriented metadata technology, and complies with the Metadata Council's Metadata Interchange Specification. As the information platform identify and collect new data over time, the metadata subsystem 26, 27, 31 constantly redefines and updates these relationships. In this way, industry perception of a particular product, company, or CEO can be monitored throughout the course of weeks, months, or years.

Cross-Information Visualization.

The importance of complex data relationship management is realized when users are able to view multiple types of information in a single visual interface. Valuable insight is gained from comparing unique statistics, such as the number of employees per year to net profits to industry perception over a time span to customer buying patterns of a flagship product.

The information platform provides users with a variety of methods for displaying both structured and unstructured information.

Structured information includes data from tables, SQL query results, and financial information in a spreadsheet.

Unstructured information includes analyst reports, product comparisons, corporate profiles and SEC 10K filings.

Visualization controls include:

Time-span slider bars to allow for comparisons of data over time;

A population quadrant to compare data frequency across multiple axis;

Cross tabular charts to analyze products across geographic regions, company dimensions, product dimensions, officer dimensions, product sales analysis, promotion analysis, market share analysis, product feature analysis, industry revenue forecast analysis, industry opinion analysis, competitive expenditure analysis, events/effects analysis.

Discussion.

The information platform integrates structured and unstructured information from internal and external data sources into visual applications for the purpose of allowing a user to make intelligent business decisions. The information platform consists of components that aid in several steps in the analysis process, namely information gathering. These steps are: the formation of a plan for an analysis; collection of external and internal information for the analysis; separation of large informational pages into component elements; review and manipulation of these component elements; and seamless transport of the collected information into various reporting desktop applications.

The information platform provides users with multiple ways for collecting vast amounts of information in the shortest time possible and provides central data access (import/export) from popular desktop reporting, and analysis products.

Import Formats
Web (*.html)
Word (*.doc)
Excel (*.xls)
Postscript (*.pdf)
SQL
Lotus Notes
OLAP
Export Formats
Web (*.html)
Word (*.doc)
Excel (*.xls)
Postscript (*.pdf)
PowerPoint (*.ppt)
ACT
OLAP The information platform provides a set of sophisticated information catalogs for finding internal and external information, along with collection profiles that retrieve requested information unattended.

The following discussion describes the feature set of the information platform.

Setting Analysis Objectives

General Discussion<Case Creation; Case Building>

Once the purpose of a report is determined, the breadth of information required for analysis is reduced, and the needs for particular data nuggets are prioritized.

Every analysis project has specific data gathering and analysis requirements: a 'market opportunity analysis' uses different data than a 'product feature audit.' As such, guidelines for collecting and analyzing data need to be established for most projects. Some guidelines are general 'one day marketing plan' items such as 'Determine Market share,' which have associated tactics of determining the companies in a market, gathering their revenue and unit sales, and finally comparing them. Most reports, however, are more far more complex and unique to market of research firms and marketing organizations. For each company, their analysis methodology provides them and their customers a sense of competitive advantage.

The information platform case feature taps into this business function by providing users with the ability to create and share objectives and tactics for each analysis project. Not only does the information platform provide users the power to create their own Analysis Cases, but the information platform provides several industry standard Case templates, that can be used and edited to perform the most thorough market research and analysis possible quickly and efficiently. Through the use of Cases and Case templates, organizations can determine what objectives as well as the types of information vital to their decision making process. The information platform automates the collection of that information and ensures that the gathered results are reviewed and digested by the appropriate individual and or groups.

Identify objectives<Case Creation: New (Blank/Template/Default

With this feature the user determines the goals of a project, which directly relates to the types and quantities of data required for collection. The user can selects from one of several Case templates (i.e. Pricing analysis, Product Feature Audit, Competitive Week-in-Review) and the system recommends objectives, including analyses and the corresponding list of data that needs to be collected.

If a user desires, he may add/edit/delete objectives as well as data elements.

Identifying and Collecting Data

Definitions

The following definitions are applied for their respective terms within this document:

Catalog Folder: The folders creating the Catalog hierarchy, these can be nested within one another to create various levels of hierarchy.

Catalog Collection Item: The item that defines the information collection node, contains information about the specific piece of information that is returned to the user when requested. May consist of one or more Info Items.

Source Topic Folder: The folders creating the Source hierarchy, these organize the sources into topics and sub-topics. These can be nested within one another to create various levels of hierarchy.

Source Folder: The folder defining a specific source of information. This source can be a web site, CD-ROM, database, or subscription service source, for example. A source may have sub-source folders if the information space is complex enough to warrant further subdivision.

Document Folder: The individual documents that can be collected from a source are each represented by a Document Folder. The Document Folder can contain one or many Info Items.

Info Item: The specific data element that is returned to the user upon request for retrieval. Associated with one or more Catalog Collection Items. For each document, there are one or more Info Items that can be collected from it. At a minimum, the full document is an Info Item. Additional, finer grained Info Items can be added which represent extracted portions of a document.

General Discussion

When users build their own Cases, they have several methods for identifying the type and scope of information to be collected.

As well, through pre-built Case Templates, the information platform assists users with analysis projects by highlighting collections of data elements that satisfy a suggested set of analysis objectives. Users may view the list of suggested data to be collected, as well as add their own data elements for the system to collect.

Knowing the sources that the system collects data from, as well as the ability to add new sources of data, is a high priority to users.

Coverage of Sources <Viewing fulfilled/unfulfilled Case Items and Sources>

For any given Case, the user is able to review and output a summary of the Case which includes a bibliography of sources that are, or will be, used in the Case.

Users are concerned that they gather data from as wide a range and variety of sources as possible. An example of this is collecting data from multiple news sources, analyst firms and web sites for a Case.

Adding data elements to a Case:

Users can add additional data elements to any case either through the systems automated collection or through the systems 'Source-Specific Search' feature or from documents they located via browsing.

<add items from Information Source Catalog>

An Information Source Catalog contains details about the locations and types of data that can be retrieved from internal and external sources. The catalog combines tree view and list view controls that allow users to identify entire documents or just important parts of a document for automated collection. As such the Catalog allows users to collect:

A single data element;

A single document; and/or

A set of either data elements or documents or both, called packages.

Browsing the Information Catalog: Users navigate the catalog by using one of the taxonomies (1: Business language, 2: Sources, 3: Input types). Users may filter and sort through the catalog based on the catalog items' properties.

Searching the Catalog: Users are able to enter simple search requests to find individual catalog entries.

<add items from Source-Specific Search Catalog>

While the Information Source Catalog contains several thousand entries for the automated collection of data, users have the power to perform targeted searches—of content located on both the Internet and intranets. A Source-Specific Search catalog contains details and access scripts for limited scope searches—searching only the sites with valuable content to the project, or rather Case, at hand. Users identify the sites or sites they wish to search, including internal systems and the results are returned in a list display.

Browsing the Site-Specific Search Catalog: Users navigate this catalog in a similar fashion to the Information Source Catalog. They may navigate one of the taxonomies (1 Business language, 2 Sources, 3 Input types). Users may also filter and sort through the catalog based on sets of properties associated to data elements.

Search Results Display: The results of the limited scope search are displayed in a list view. The list displays properties such as description, source, input criteria and relevancy ranking.

<add items from viewing other documents: htm, doc, xls, pdf>

Users who identify valuable documents and/or information while in other popular desktop applications can add their 'finds' to the system by way of an active Case. (Using some type of 'send-to' or 'copy/past' feature entire documents or unique data elements can be added to an active Case.)

Automated Retrieval of Data

General Discussion<User Sets>

The information platform automates the collection of Information Source Catalog items. As well, the information platform automates the limited scope searching across high value sites in its Site-Specific search Catalog.

The information platform maintains access scripts for collection information from each source, both the Information Source Catalog and the Specific-Site Search Catalog. As such, users may be required to enter various criteria based on the needs and intricacies of each site's search engine. Rather than have the user input criteria for each site, the information platform maintains User Sets.

<User Sets>

User Sets store and maintain frequently used criteria for collection and search. User sets contain information including, for example:

Companies to watch list; and

Product to watch list.

User Sets Display: User Sets are displayed using a tree view list view control. Sets are presented in a hierarchy with folders and sub-folders for organization.

Creating Sets: Users sets may be created from scratch by the user, or compiled as the result of a result list.

Editing sets: Items may be added to a set, such as a new company name.

Sharing Sets: Users are able to share sets with other users.

Tracking retrieval status.

Users can view the progress of a Case collection at any time. The Case maintains properties that informs the user as to the percent/status of the gathering process. As well, users can check the server queue to see the status of multiple Cases. Lastly, users are notified of various system and Case progress via iconic representations on the task bar.

Viewing Information

General Discussion

Users have the ability to view Case items and Search Items whether a Case has been fulfilled or only partially completed. Cases are located on a corporate server, and depending on access privileges, they may (or not) be shared with a group, a department or an entire company.

<Viewing Case Items>

When a user opens a fulfilled Case, they can view the Case items using the tree view list view controls. Case items are organized in folders and sub-folders that display their Case Items contents in the list view. When a user wants to view a particular item, they select an item from the list view and the information it is displayed in a browser window. Case items are displayed using OLE automation as .doc, xls, .pdf and .htm files depending on the individual Case item. Users can edit the case items from within the information platform.

<Viewing Search Results >

Search results are displayed to the users as a list of documents with additional properties such as description, source, input criteria, date of search, and date of document. A user selects a document to view, and that item is displayed in the Document Viewer.

<Viewing information with the Document Analyzer>

Document Viewer: a window that instantiates Internet Explorer, Excel, Word, or Acrobat to view the document.

Page Geometry: a window displays the elements of a document in a thumbnail view, showing items such as title, headline, paragraph, quote, chart, and table. Clicking on a particular item on thumbnail displays that item in the document viewer. In a reverse manner, when the user is using the Document viewer, the thumbnail identifies the where they are in the document.

Data nugget display: this window displays the particular data nugget value that is added to a Case Binning: the system parses the document and allows data nuggets to be displayed in information platform Bins—preconfigured bins that identify items such as charts, tables, statistics, or quotes. Users can create custom bins. When a user selects a bin—i.e. analyst quote—only analyst quotes are displayed in the Document Viewer.

Adding other data elements to a Case

When users identify valuable data elements through browsing, searching, or using the Analyzer, they can easily add those items to a case. The user is prompted to assist with the categorization of that item.

Working with Popular Desktop Applications

General Discussion

Case items are collected and stored in popular desktop application formats, such as .doc, xls, .pdf and .htm. Each Case item has been parsed and given structure. As such, case items can easily be exported to desktop applications such as Word or Excel.

Panning nuggets from Office.

Menu items can be optionally installed in Word and Excel, supporting catalog browsing, and information retrieval. All jobs are submitted high priority, and the client task is held waiting for the information to be gathered; the user is presented with a progress dialog (containing a Cancel button). The information is inserted at the current cursor position.

Note: this feature requires a custom retrieval client that pushes the data to the host desktop application using OLE automation.

Fill-me-up templates (For routine reports, or company specific reports)

The information platform provides, for example pre-built and custom documents and spreadsheets that are filled with predetermined data nuggets once they are collected. This is valuable for companies that perform several 'routine' reports.

E-mail.

A retrieval job can be e-mailed to the client (using MAPI-compliant transport) as an e-mail with each information nugget as an attachment.

Administration Issues

Sharing Fulfilled Cases

<Case>

Cases reside on a server. This leads to at least three benefits. 1) Cases vary in memory footprint from a few megabytes to several gigabytes, keeping these on the server limits storage issues. 2) Cases may be fulfilled while the user(s) perform other activities that require processing power on their client PCs. 3) Fulfilled Cases can be shared company wide and access privileges can be administrated using standard NT users and groups policies.

Sharing Case Templates

As organizations mature in their use of Cases and Case template, they want to share their frameworks across a group, a department or company. As such, the information platform provides methods for sharing Case templates, editing Case templates and maintenance of a Template Master Set.

Sharing User Sets

As organizations mature in the use User Sets, they want to share them across a group, a department or company. As such, the information platform provides methods for sharing User Sets and the maintenance of a Master User Set(s).

Sharing Favorites

Similar to sharing Case Templates and User Sets, the information platform provides for the sharing of Favorites across a group, a department or company. The information platform provides methods for sharing Favorites and the maintenance of a Favorite Master Set.

Information Source Catalog

Catalog Editing

Users with security access may Change Classifications and relationships in the catalog. The catalog is extendible, which allows users the opportunity to add nodes, classifications and packages.

Catalog Updates—Knowledge Network

Catalog information pushed to customers using TCP/IP.

The updates are synchronized with the customers catalog to ensure that customer modifications and additions are retained, while the virgin catalog entries are updated.

Source Specific Search Catalog

Search Catalog Editing.

Users with security access may Change Search Classifications and relationships in the catalog. The catalog is extendible.

Search catalog Updates. Search Catalog information can be (perhaps by subscription) pushed to customers using TCP/IP.

The updates are synchronized with the customer's search catalog to ensure that customer modifications and additions are retained, while the virgin catalog entries are updated.

Subscription Management

Subscription Assistant

There are times when users need to either collect a Case Item, or perform a Site-Specific Search at a source requiring a subscription. Subscription details are maintained in the User Sets.

However, there may be times when a user does not have a subscription to a source. If users desire to subscribe to a site, the information platform assists them.

Security

The information platform operates in conjunction with standard NT users, groups and policies, avoiding the effort of maintaining a custom set of users and groups.

General Architecture Evaluation

The system is implemented as a multi-tiered client-server application. The primary benefits of implementing the product as a client-server platform are as follows:

Multi-User features such as security, shared configurations and system administration are accommodated and centrally located.

Slow, lengthy or resource intensive tasks are assigned to the server for completion, allowing the user to proceed with other activities.

Data retrieval tasks can be performed unattended—i.e. collection can be scheduled and automatically collected once a month.

By serving the information as HTTP/HTML compliant information, users can access the system from a kiosk, a NC workstation or from a remote system via a web browser.

By storing the catalog on a server, all users can share a common catalog without the need to copy catalogs to client workstations.

Updates made to the data source catalog are 'pushed' directly to one location: the server.

The drawbacks of using a client-server architecture are as follows:

The system must have a "local" server option to easily download and install as a single user evaluation version.

Implementation of a disconnected (i.e. use while on a airplane) model is complex and can be time consuming.

Profiles

Users

The broad base of users of the information platform are business decision makers who currently collect, maintain, and utilize information from internal and external resources. These resources include, but are not limited to, documentation and databases, marketing materials, financial data, subscription and professional information services information, Internet & Intranet information, and press publications.

A target segment, for example, of this user base is defined by the following characteristics:

Profession.

The user is a financial analyst focused on the high technology industry. The user completes analyses of data from internal, external, and subscription sources on a regular basis. The user collects and analyzes the data and creates reports and presentations based on the results of the data collection and analysis.

Professional Experience.

The analyst's professional experience ranges from 5 to 25 years. The analyst's age ranges from 25 to 45 years.

Computer related Experience.

The user's computer experience ranges from intermediate to expert with the Windows 95 or Windows NT operating systems. An intermediate user has general knowledge of the system, is able to switch between applications, and has experience using general office applications such as word processing, spreadsheet, and presentation software. An expert user has in depth knowledge of the system, and be able to configure and maintain the system.

On-line Experience.

The users on-line experience ranges from novice to expert. A novice user has little or no experience using on-line information. An intermediate user has several weeks to months of experience using on-line information, with most experience derived from email and web browser usage. An expert user has several months to years of experience using on-line information.

Education.

The user has at minimum a Bachelor's degree in Finance.

Knowledge Gathering

Table 1 below describes the knowledge gathering aspect of the information platform.

TABLE 1

Knowledge Gathering

| User Processes | User Tasks | Tasks & Functions | Components Used | Functions Available |
|---|---|---|---|---|
| Client needs & objectives | Determine needs and objectives | <none> | | |
| | Create new Case | Start Case, set aside space | New Case dialog | Create blank case<br>Create case from template<br>Set title for new case |
| | <none> | Set pre-built Objectives, collection Case Items, and Search Items for case template, if used | New Case dialog; Case | Set of pre-built objectives<br>Set of pre-built case items and search items |
| | Open existing Case | Show available Cases, allow opening of selected Case | Open Case dialog | Filter and sort Case listing based on properties<br>Select Case to open<br>Opening a Case closes current Case |
| | Set or edit Case properties | Record properties | Case | Set Case properties: Title; Description; Owner; Categories; Security/Access Rights; Sharing |
| | Edit Case Objectives | Enter or edit objectives | Case | View, edit any predefined needs for case template, if used<br>View, add, edit, organize objectives<br>Edit Objectives properties: Fulfillment Status; Description; Due Date; Status; Priority; Percentage Complete; Owner |
| | Edit Case Items | Enter or edit case items | Case; Catalog; User Sets; Favorites | View, edit any predefined case items from template<br>View, add, edit, organize case items |
| | Create new case template | Save settings as new template | Save As dialog | Edit objectives<br>View, add, remove case items<br>Save as Case template |
| | Create new Catalog collection item | Store settings as new collection item | Case; Catalog | View, add, remove collection items<br>Save as collection item package |
| Data collection | Review case items | | Case; Catalog | View Case Item information and properties<br>Edit Case Items properties: Name; Description; Criteria; Categories; Collection Timing; Author |
| | Determine or refine information needs for case | Update Case Items | Case; Catalog; User Sets; Favorites | Add, remove, and edit Case Items |
| | | Provide sources, information categories, inputs | | Select categories, sources, common inputs; select Catalog Items to add to the Case<br>Enter criteria for collection of Case Item |
| | | Provide gathering structures | | Collect the specified information |
| | Filter the Catalog for collection items | Filter and sort the Catalog display by property | Catalog | Set filters<br>Select sort property<br>Update Catalog display to match filtering and sorting settings |

TABLE 1-continued

Knowledge Gathering

| User Processes | User Tasks | Tasks & Functions | Components Used | Functions Available |
|---|---|---|---|---|
| | Review Case Item progress | Display Case Item and progress information | Case | View properties<br>Edit properties for collection |
| | Search for information at sources | Display Search Catalog for information retrieval | Case; Catalog; User Sets | Add, remove Search Items<br>Edit Search Items for the Case and their properties: Name; Description; Criteria; Search Timing; Author |
| | Browse for information at sources | Navigate to source information | Case; Catalog; Favorites; Document Analyzer | Add information to Case from source data item<br>Edit properties for collected Case Item |
| | Edit catalog structure | Add catagories<br>Add collection packages<br>Assign items to categories<br>Categorize items | Catalog | Add category<br>Add package<br>Add items<br><br>Choose existing items to associate with category<br>Choose categories to associate with item |
| | Add sources to catalog, select source and categorize | Access source and information<br>Categorization of source and items available<br>Add source and relationships | Catalog | Select source<br><br>Categorize source information |
| Think, review data, analyze the data | Review retrieved data | Display data elements | Case | Select Case to view<br>Select items within the Case to view<br>Cut, copy, paste information<br>Edit data<br>Output information |
| | Analyze collected item | Display thumbnail | Case; Document Analyzer | View components<br>Select components |
| | | Display components | | Select component types to view<br>Zoom in (parse selected components) |
| | | Show components by type<br>Parse and display selected components | | Zoom out (parse document)<br>Edit data or component<br>Add–Remove from Case<br>Output information |
| | Analyze across data items | <none> | | |
| | Filter & sort retrieved information elements | Allow filtering and sorting by property | Case | Enter filter criteria<br>Sort by property<br>Update display to items matching settings<br>Select item for manipulation |
| Create report outline | Select or create outline in reporting tool of choice | <none> | | |
| Write report | Move data information | Export data to correct format for reporting tool | Case | Select item or data elements within item<br>Copy selection<br>Output/export selection |
| | Edit gathered information | Edit information with compatible tools | In-place editing tools | Edit item<br>Save, output, export item |
| | Edit report information | <none> | | |
| Publish report draft for feedback | Output draft | <none> | | |
| | Select recipients | <none> | | |
| | Edit report based on feedback | Edit and reexport data to correct format for reporting tool | Browser | Select item or data elements within item<br>Copy selection<br>Output/export selection |
| Publish final report | Output final report | <none> | | |
| | Select recipients | <none> | | |

The following discussion provides an outline of a full task analysis of the information platform.

Figure 2:
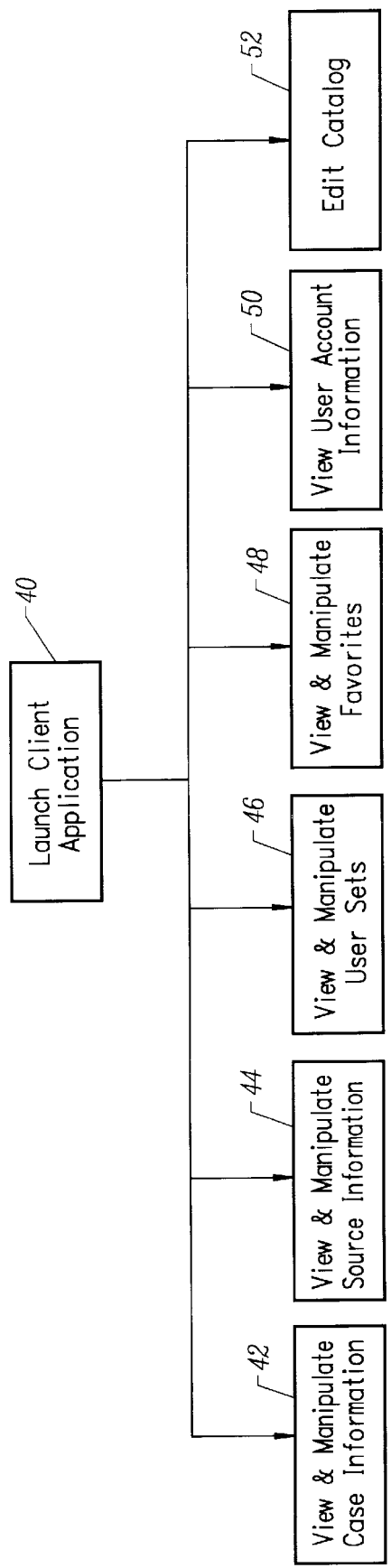
FIG. 2 is a block diagram of information platform task analysis according to the invention.

FIG. 2 is a block diagram of information platform task analysis according to the invention. FIG. 2 shows top level client application operation, in which a client application is launched 40. The client (user) may then view and manipulate case information 42, view and manipulate source information 44, view and manipulate user sets 46, view and manipulate favorites 48, view user account information 50, or edit the catalog 52. Each of these operations is discussed in greater detail below.

Figure 3A:
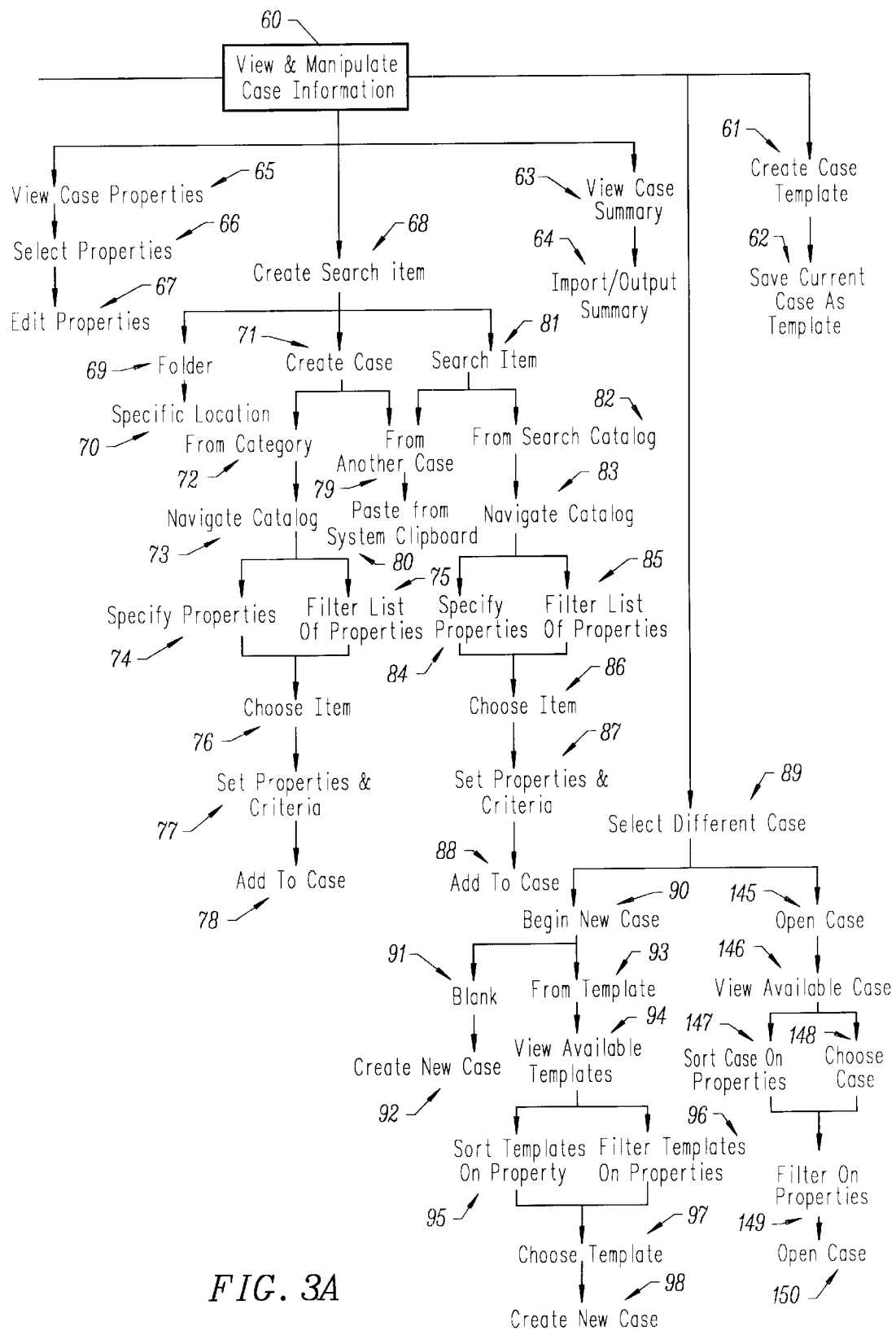
FIG. 3 is a block diagram of information platform source information breakdown according to the invention.
Figure 3B:
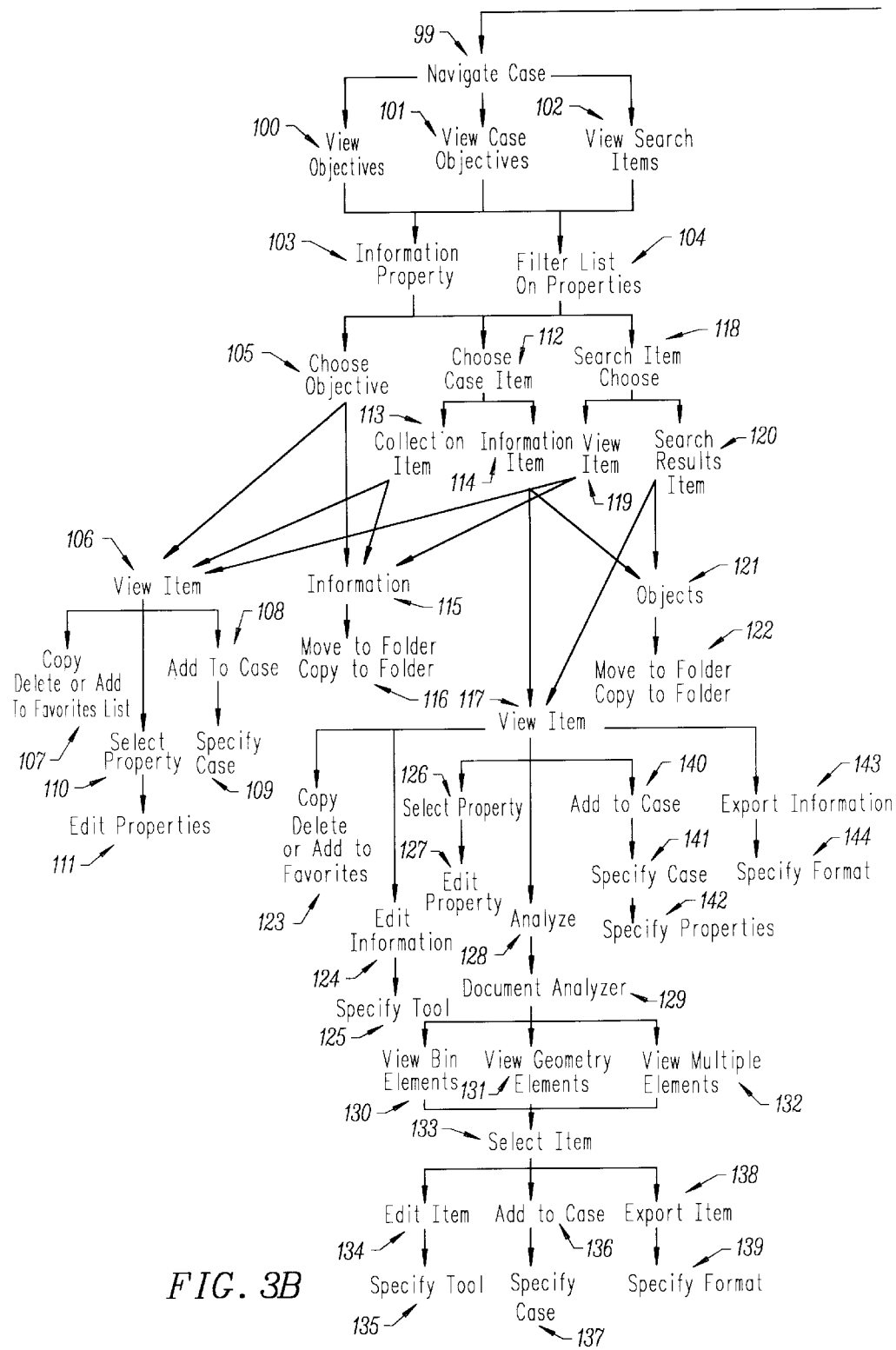

FIG. 3 is a block diagram of information platform source information breakdown according to the invention. More specifically, FIG. 3 identifies the flow with regard to client viewing and manipulation of case information 60. At the highest level, a user may navigate a case 99, view case properties 65, view a case summary 63, or create a case template. Each of these operations is discussed in greater detail below.

When navigating a case 99, the user may view objectives 100, view case items 101, or view search items. For each of these operations, the user may sort a list of such information on properties 103 or may filter the list on properties 104. Thereafter, the user may choose an objective 105, choose a case item 112, or choose a search item 118.

If an objective is chosen 105, the user may view the item 106 and either copy, delete, or add the item to a favorites list 107, select a property 110 and edit properties 111, or add the item to a case 108 and specify the case 109.

If a case item is chosen 112, the user may select a collection item 113 or an information item 114. If a collection item is chosen 112, the user may view the item 106 and either copy, delete, or add the item to a favorites list 107, select a property 110 and edit properties 111, or add the item to a case 108 and specify the case 109. If an information item is chosen 114, the user may view the item 117 or organize the information 121 and move the information to a folder or copy the information to a folder 122.

If the user views the item 117, the user may copy, delete, or add the item to a list of favorites 123, select a property 126 and edit the property 127, edit the information 124, and specify a tool for such editing 125, add the item to a case 140, specify the case to which the information is to be added 141, and specify the associated properties 142, export or output the information 143, specifying the format 144, or analyze the information 128 using a document analyzer 129. Document analysis can proceed by viewing bin items 130, geometry elements 131, or multiple elements 132. An item is then selected 133 and the item may be edited 134 using a specified tool 135, added to a case 136, where the case is specified 137, or exported or output 138 using a specific format 139.

If the user chooses a search item 118, the user may view either a search item 119, where the user may view the item 106 and either copy, delete, or add the item to a favorites list 107, select a property 110 and edit properties 111, or add the item to a case 108 and specify the case 109; or the user may search a results item, in which case the user may view the item 117 or organize the information 121 and move the information to a folder or copy the information to a folder 122. An explanation of the user view selection 117 is provided above.

When viewing case properties 65, the user may select a property 66 and edit the property 67.

When viewing a case summary 63, the user may edit associated properties, copy, or import/output the summary 64.

When creating a case template 61, the user may save a current case as a template 62.

When creating a search item 68, the user may create a folder 69 in a specific location 70, create a case item 71 from a specific category 72, where the user may navigate the catalog 73 and either sort a list of items on a specific property 74 or filter the list on properties 75, choose an item 76, set properties and criteria for the item 77, and add the item to the case 78; or the user may create the case from another case 79, where information may be pasted from the system clipboard 80. Further, the user may create a search item 81 from another case 79, where information may be pasted from the system clipboard 80; or the search item may be created from the search catalog 82 by first navigating the catalog 83 and then either sorting a list on a specific property 84 or filtering the list on a properties 85. Thereafter, the user chooses the item 86, sets properties and criteria 87, and add the item to the case 88.

Finally, when selecting a different case 89, the user may either begin a new case 90, where the case is either blank 91 and a new case is created 92, or from a template 93, where the user first views the available templates 94 and either sorts the templates on a specific property 95 or filters the templates on properties 96, and then chooses the template 97, and creates the new case 98; or the user may open an existing case 145, first viewing the available cases 146, either by sorting the cases on a specific property 147 or by filtering the cases on properties 148, and thereafter choosing the case 149 and opening the case 150.

Figure 4:
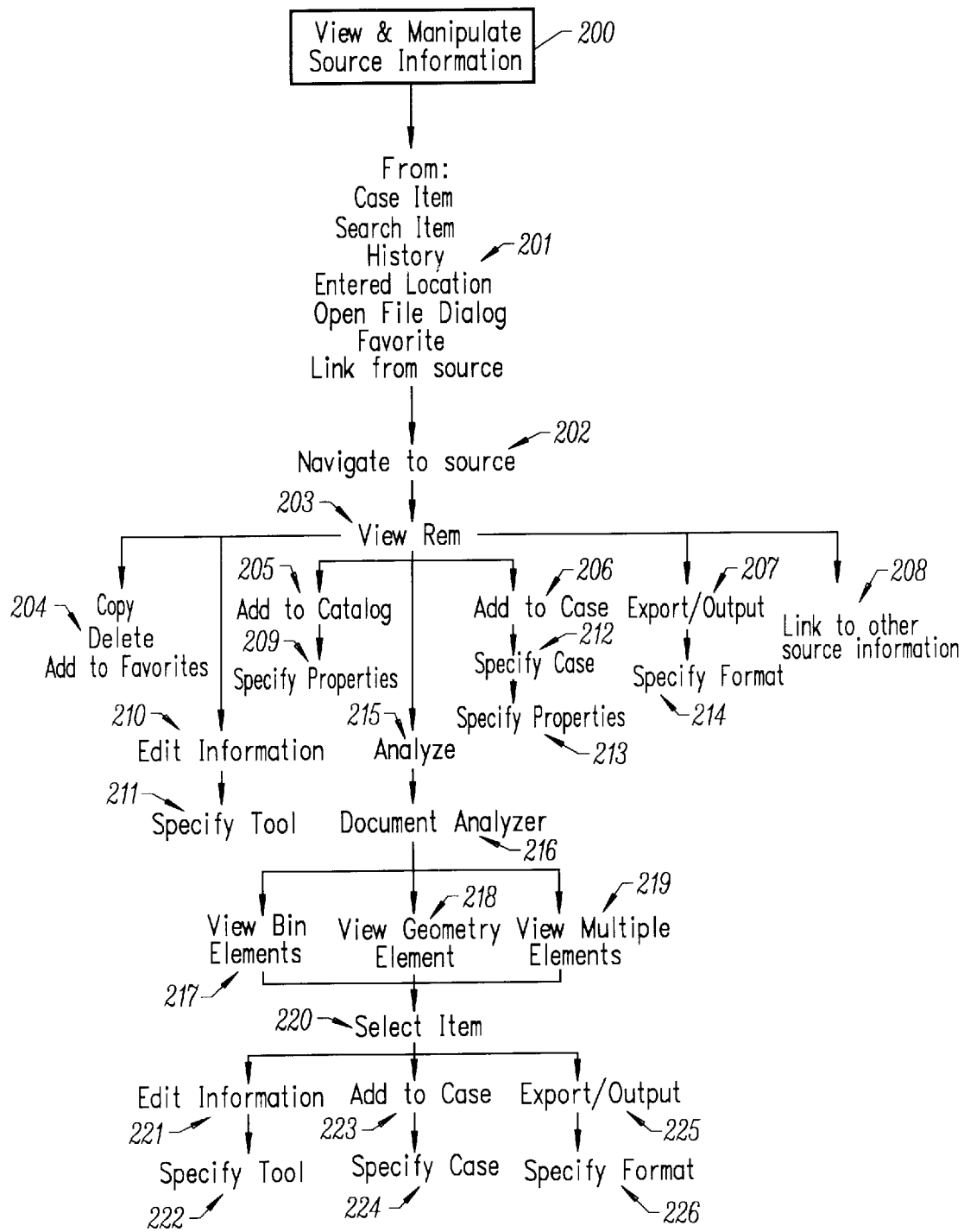
FIG. 4 is a block diagram of information platform manipulate source information breakdown according to the invention.

FIG. 4 is a block diagram of information platform manipulate source information breakdown according to the invention. More specifically, FIG. 4 identifies the flow with regard to client viewing and manipulation of source information 200. This operation is discussed in greater detail below.

The source information is obtained from any of case items, search items, history, an entered location, an open file dialog, a favorite, or a link from a source (201). The user navigates to the source 202 and may view the item 203. The use may then copy, delete, or add the item to a list of favorites 204, add the item to the catalog 205, specifying item properties 209, add the item to a case 206, specifying the case 212 and case properties 213, export or output the item 207, specifying the format 214, edit information 210, specifying a tool therefor 211, or link the item to other source information 208.

Importantly, the user may analyze the information 215 using a document analyzer 216. Such analysis may involve viewing bin elements 217, viewing geometry elements 218 or viewing multiple elements 219. An item is then selected 220 and may be edited 221 using a specified tool 22, added to a case 223, where the case is specified 224, or exported/output 225 in a specified format 226.

Figure 5:
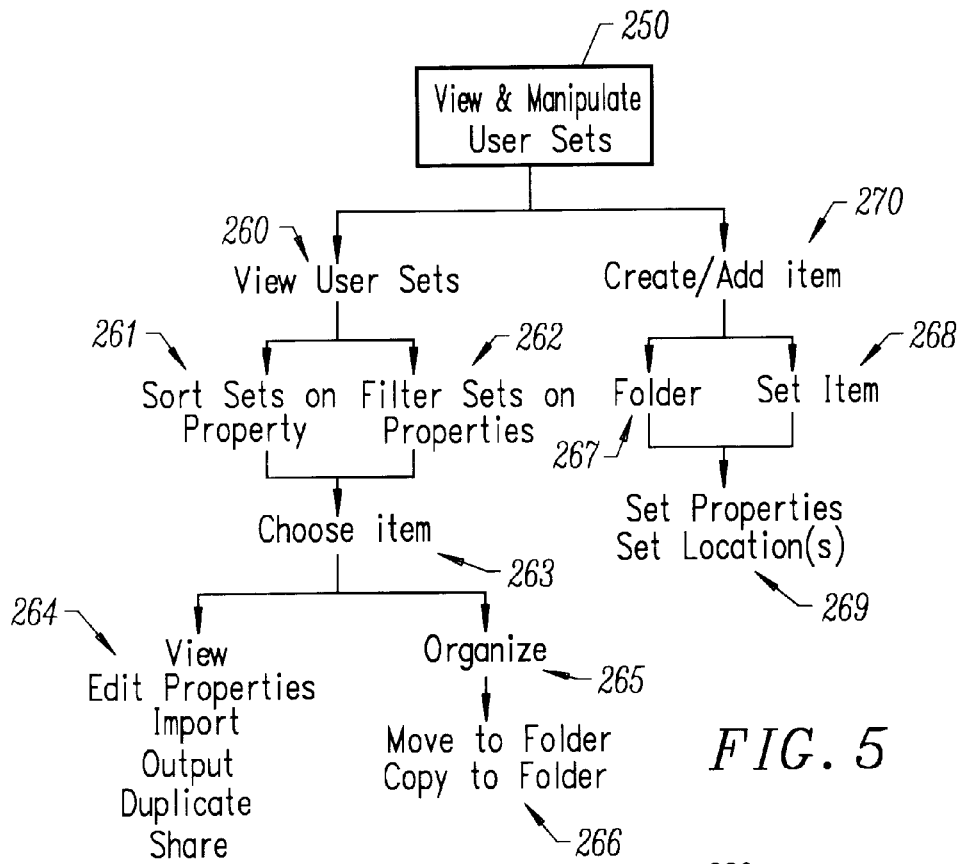
FIG. 5 is a block diagram of information platform source user set breakdown according to the invention.

FIG. 5 is a block diagram of information platform source user set breakdown according to the invention. More specifically, FIG. 5 identifies the flow with regard to client viewing and manipulation of user sets 250. This operation is discussed in greater detail below.

The user may either view user sets 260 or create/add an item 270. If the user views user sets 260, the user may sort the sets on a specific property 261 or filter the sets on properties 262, choose and item 263 and either view the sets, edit set properties, import or output a set, duplicate a set, or share a set 264; or organize the set 265 and either move the set to a folder or copy the set to a folder 266.

If the user creates/adds an item 270, the item may be either a folder 267 or a set item 268, both of which allow the user to set properties and/or locations for the item 269.

Figure 6:
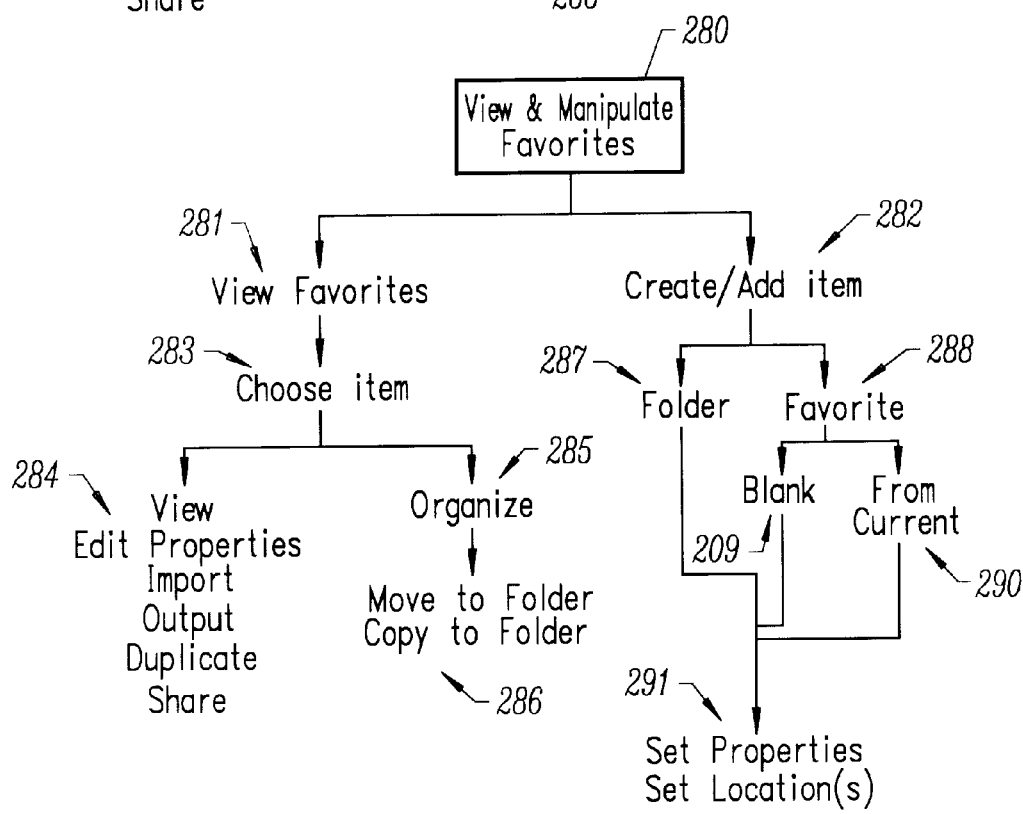
FIG. 6 is a block diagram of information platform favorites breakdown according to the invention.

FIG. 6 is a block diagram of information platform favorites breakdown according to the invention. More specifically, FIG. 6 identifies the flow with regard to client viewing and manipulation of favorites 2880. This operation is discussed in greater detail below.

The user may either vie favorites 281 or create/add item 282. If the user views favorites 281, an item is chosen 283 and the user may either view the sets, edit set properties, import or output a set, duplicate a set, or share a set 284; or organize the set 285 and either move the set to a folder or copy the set to a folder 286.

If the user creates/adds an item 282, the item may be either a folder 287 or a favorite item 288, both of which allow the user to set properties and/or locations for the item 291. With regard to the favorite item, the user also may select from a blank favorite 287 or a current favorite 290.

Figure 7:
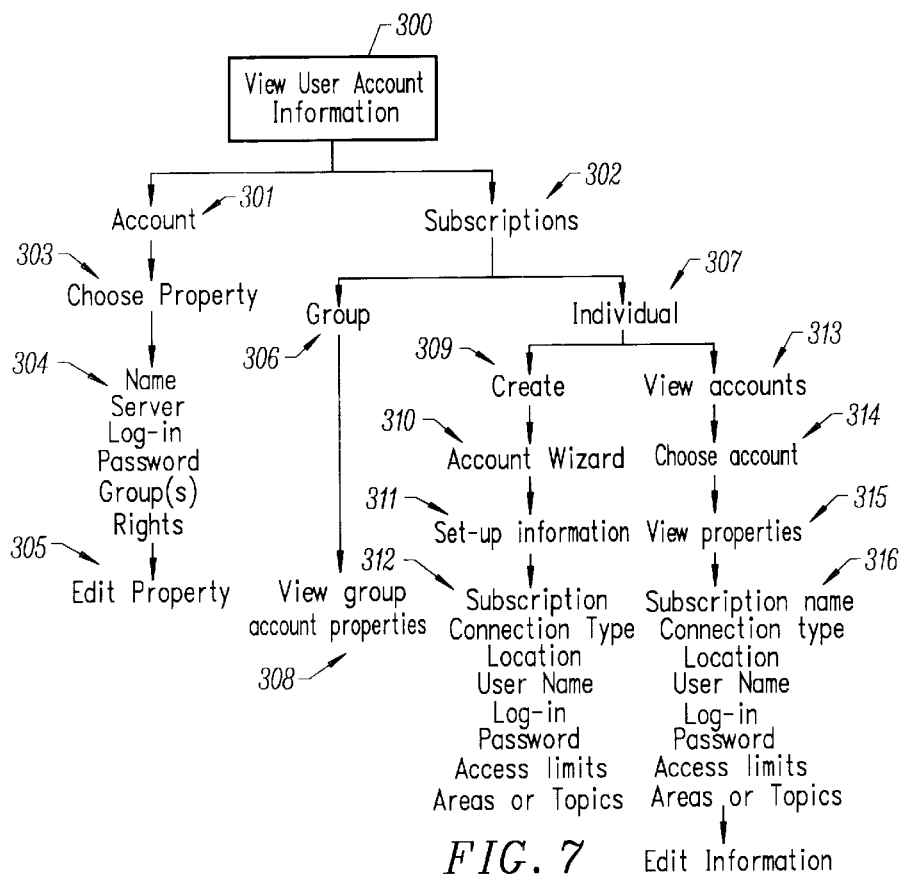
FIG. 7 is a block diagram of information platform user account breakdown according to the invention.

FIG. 7 is a block diagram of information platform user account breakdown according to the invention. More specifically, FIG. 7 identifies the flow with regard to client viewing of user account information 300. This operation is discussed in greater detail below.

The user account information includes account information 301 and subscriptions 302. For the account information, the user chooses a property 303, specifying such items as name, server, log-in, password, group(s), and rights 304, each of which may be edited 305.

For subscriptions 302, the subscription may be a group subscription 306, where the group account properties may be viewed 308; or it may be an individual subscription 307. For an individual subscription, the user may create a subscription 309, for example using an account wizard 310, providing set-up information 311, including subscription type, connection type, location, user name, log-in, password, access limits, and areas or topics (312). The user may also view an existing account 313 by choosing the account 314, which allows the user to view the account properties 315, such as subscription name, connection type, location, user name, log-in, password, access limits, and areas or topics (316). the information may be edited 317 as appropriate.

Figure 8:
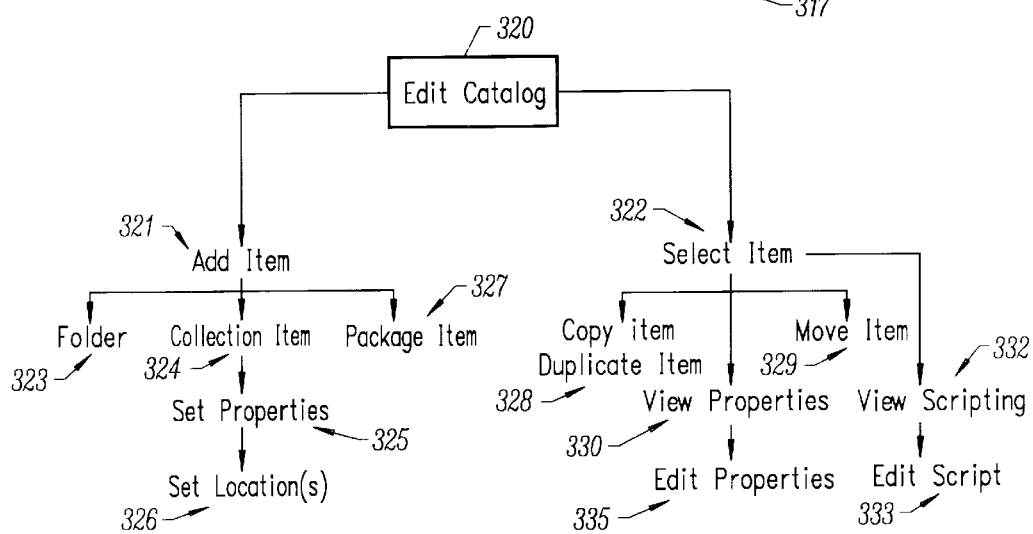
FIG. 8 is a block diagram of information platform editing a catalog breakdown according to the invention.

FIG. 8 is a block diagram of information platform editing a catalog breakdown according to the invention. More specifically, FIG. 8 identifies the flow with regard to catalog editing 320. This operation is discussed in greater detail below.

When editing a catalog, a user may either add an item 321 or select an item 322. Items that may be added include folders 323, collection items 324 which have specified properties 325 and locations 326, and package items 327.

When selecting an item 322, the user may either copy the item or duplicate the item 328, view item properties 330 and edit those properties 331, move the item 329, or view a script 332, and also edit the script 333.

Table 2 below lists some of the tasks performed by the users.

TABLE 2

User Tasks

| Domain | Task | Description | Steps & Entries |
|---|---|---|---|
| Basic Information Retrieval | <Example> Use the information platform client to get a specific nugget of information | Retrieve all the press releases issued in June by Apple, Microsoft, Intel and Aeneid. | Open catalog Choose documents (press releases Enter company names Select get now View collected information |
| | Select a profile for rapid comprehensive data gathering | For example, the user may enter a company name and then be presented with a rich body of information that was (semi)automatically gathered. | |
| | Use the information platform client to get a specific nugget of information | Retrieve, for example, all the press releases issued in June by four companies. | |
| | Add a piece of data to an Excel spreadsheet. | While working in Excel, the user may add some data from a SEC 10K, for example. The user chooses "Insert Information" from the information platform menu and then select what information to retrieve, and where to place it. The metadata (identifying information source) is added as a note to the worksheet. | |
| | Add a piece of data to a Word document | | |
| | View the information download log, and use it to search for a specific piece of information. | | |
| | View the Retrieval Queue. | This is similar to viewing a network printer queue. The queue identifies what jobs are pending, who submitted them, the priority, and the data to be retrieved. | |

TABLE 2-continued

User Tasks

| Domain | Task | Description | Steps & Entries |
|---|---|---|---|
| Advanced Information Retrieval | Run an analysis Create a bibliography/sources document as foundation of a research project Create an information retrieval job | Controls what information is retrieved, how frequently it should be retrieved, and where the information is stored. | |
| Catalog Management | Add an internal data source to the catalog Modify the classification of a data source Browse the catalog looking for the types of information Add a new set of classifications to the catalog From Explorer, add a site to the catalog From Explorer, add a page to the catalog Define the geometry of an unknown page to allow for the intelligent gathering of elements of the page Configure the team's custom relationships and interests. | Setting the competitor list by market segment, configure the most influential companies in each market segment, rating of value, influence and accuracy of all information sources. | |
| | Create a custom analysis Configure the preferred sites to gather specific information. | The customer is able to define where to go for information when the system includes multiple potential sources. The user should also be able to set a "get from the cheapest" option when multiple are available | |
| User/System Management | Configure individual user rights Configure rights for a group | Rights include the ability to add/edit/delete sites, users, groups, profiles; access to sites; controls which elements of the resource catalog are accessible. | |
| | Add a user to a group Add/View/Modify/Delete the site list which details the configuration and logon details for secure/subscription sites. View the activity log Control which activities are logged Control how often catalog updates are accepted. | Using NT services Site location, user, password, | |

Client Design

Introduction.

The various components that make up the information platform offer the user of the platform a host of functionality in an integrated, seamless information environment. To discuss the concepts and functionality of these components, the following discussion maps out the various capabilities of each.

Client Interface Design.

The client application must be able to incorporate the various controls in an integrated manner. In addition, there must be document display support, navigation, searching, and printing capabilities.

Installation.

There is a Windows installation application that installs all the necessary components on the user's system as well as locate the database that is used for Catalog information storage. The user is able to specify where the components are located and various installation settings during the installation process.

Upon launch of the installer, the application determines if current or previous versions of the application or components are installed on the user's system. If components are detected, the user is informed that some components are installed and the application installs or updates the required components.

The user has the choice of completing a Typical or Custom installation.

User Accounts.

During installation, the user selected a server that stores the Catalog and Case information. The user also may have selected an existing user account that was created on the server for them to use. If the account is not available at installation, the user is prompted to select an account when the application is first launched.

Once the user has installed the appropriate components, the application can be launched and the user is automatically logged into their user account using the stored user information. The user enters their user password each time the system is launched to access the system.

Global Elements.

Navigation.

There is a navigation support built into the information platform client.

History Tracking and Access.

Viewing and selecting from history of interactions;
History includes location, controls, entries;
Integration with the Windows' system history; and
Viewing history across sessions.

ARL Encoding and Display.
Navigation to specific elements;
Show the path, ARL, URL, other information about path;
Use a Open (Point interaction or allow free form typing, or both.

Progress Information Feedback.
Navigation to a location or data item;
Anytime the system is busy in a foreground task, animation and status feedback is necessary;
Background tasks, like queued retrieval or updating, should be viewable but not prominent Menus The menu consists of File, Edit, Tools, History, Favorites, and Help. In the following tables, menu separators are shown as double lines between table cells.

TABLE 3

File Menu

| Menu Item | Function |
|---|---|
| New ( | Cascades to the following items ... |
| Case ... | Displays the New Case dialog, allowing the user to create a new blank Case or a new Case from a template. |
| Objective | Creates a new Objective in the current case. If the user has an Objective folder selected, then the new Objective is created in that folder, otherwise it is created at the top level. |
| Case Item | Creates a new Case Item from the currently displayed item. |
| Search Item | Creates a new Search Item, opening the Search Catalog for the user to choose a search. |
| User Set Item | Creates a new User Set item, allowing the user to enter the item properties. |
| Favorite | Creates a new Favorite for the currently selected item, this item can be a location (like a web site, database, document, local folder), Case element, or Catalog element. |
| Folder | Creates a new folder in the item that has focus. The items that can have the focus are: in the Case control, Objectives, Case Items, Search Items; in the User Sets control, the control itself (top level) or a Set Folder; in the Favorites control, the control itself or a Favorites folder; in the Catalog, the various levels within the hierarchy. |
| Open ( | Cascades to the following items ... |

TABLE 3-continued

File Menu

| Menu Item | Function |
|---|---|
| Item | Opens the currently selected item, usually a folder or file. |
| Case ... | Displays the Open Case dialog box. |
| File ... | Displays an Open File dialog box, which allows the user to open a file. |
| Location ... | Displays an ARL entry dialog box for the user to enter a location to open. |
| Save ( | Cascades to the following items ... |
| Item As ... | Displays a Save As dialog for the currently displayed information. The user can save the item as a file in the following formats: MS Word (*.doc); MS Excel (*.xls); plain text (*.txt); Web page (*.html); or MS PowerPoint (*.ppt). |
| Case As ... | Displays the Save Case As dialog, allowing the user to save the Case as a new Case of as a Case template. |
| Page Setup ... | Displays the system Page Setup ... dialog to allow the user to set printing options. |
| Print ... | Prints the currently displayed item using the system Print dialog and print drivers. |
| Delete | Deletes the currently selected file or item. |
| Rename | Selects the name of the currently selected item for editing. |
| Properties | Displays the properties of the currently selected item. |
| Exit | Exists the application. |

TABLE 4

Edit Menu

| Menu Item | Function |
|---|---|
| Undo | Reverses the last N actions by the user. The user can undo all the actions performed from the launch of the product, up to 100 actions. |
| Cut | This is enabled at any time the user can edit text. The currently selected text is copied to the clipboard and deleted from its current location. |
| Copy | This is enabled at any time the user can edit text. Copies the currently selected text to the clipboard. |
| Paste | This is enabled at any time the user can edit text. Pastes the text from the clipboard to the selection entry point. |
| Delete | This is enabled at any time the user can edit text. Removes the selected text from its current location. |
| Select All | Selects all the items or text displayed in the control that has focus. |

TABLE 5

Tools Menu

| Menu Item | Function |
|---|---|
| Cases | Displays the Cases control. |
| Catalog | Displays the Catalog control. |
| Document Analyzer | Displays the Document Analyzer control. |
| User Sets | Displays the User Sets control. |
| Favorites | Displays the Favorites control. |
| <Supplemental Applications List> | List of applications that the user can evoke to manipulate the data. Examples are Microsoft Office applications (Word, Excel, PowerPoint, Outlook) or reporting software (ACT). (option 1) Selecting an item from the list uses the application to edit or manipulate the currently displayed element in place. (option 2) Selecting an item from the list launches the application and open the currently selected element as a new untitled document within the application. |

TABLE 6

History Menu

| Menu Item | Function |
| --- | --- |
| Back | Navigates to the previously item in the History list. Disabled if the current item is the first item in the list. |
| Forward | Navigates to the next item in the History list. Disabled if the current item is the last item in the History list. |
| <History List> | Displays the list of items in the History list. Selecting an item navigates to that item. |

TABLE 7

Favorites Menu

| Menu Item | Function |
| --- | --- |
| Add . . . | Adds the current element to the user's Favorites, allows the user to specify a name and other properties with a dialog box. The item can be a location (e.g. a web site, database, document, local folder), Case element, or Catalog element. |
| Open . . . | Opens the Favorites control. |
| <Favorites List> | Displays the list of user Favorites, if there are folders and sub-folders, they are displayed as cascading menu items. |
| Internet Explorer ( | Cascades to a list of the Favorites for Internet Explorer of for the Windows system. |
| Netscape Nagivator ( | Cascades to a list of the Favorites for Navigator. |

TABLE 8

Help Menu

| Menu Item | Function |
| --- | --- |
| Contents | Opens the help file to the Contents. |
| Index | Opens the help file to the Index section. |
| About | Opens the About box for the application. |

Toolbars
  Controls.

The various components that make up the information platform offer the user of the platform a host of functionality in an integrated, seamless information environment. To discuss the concepts and functionality of these components, the following maps out the various capabilities of each.

Cases Control.

The Case is center of the information platform environment, it is the home base for the user to compile and review the information space that satisfies their business intelligence needs. The Cases control allows the user to set objectives, collect and review information for an individual Case, and manage multiple Cases. The elements of a Case are: Title, uniquely identifying the Case; Properties, defining the Case; Objectives, items to be fulfilled for the Case; Case Items, the information items that fulfill the Objectives; and Search Items, the results from source searches. The Cases Control uses the Hierarchy and Filtering List controls to display some of its elements. The Objectives, Case Items, and Search Items are all displayed in a combination hierarchy and list.

Case Elements
  Case Title.

The Case Title is a user defined text field, up to 256 characters, titling the Case. The user can directly enter the title of the case in the field, and the user can retitle the Case at any time. When the user retitles a Case, if there is a Case that already has the specified title, the user is prompted to replace the old Case with the current one or title the current Case using a different title.

In a multi-user environment, the titling of the Case is limited to those with Ownership or Authorship status only.
  Properties.

Each Case has a set of properties that can be reviewed by the user. The user can edit some of these properties (*), others are produced and updated by the system. Table 9 below identifies these properties.

TABLE 9

Case Properties

| Property | Description |
| --- | --- |
| Icon | Iconic representation for the Case <may be different for shared, user is owner, user is author> |
| Title* | Title for Case, user defined |
| Description* | User defined text |
| Date & time created | System set time stamp |
| Date & time last modified | System updated time stamp |
| Owner* | User name of current Case owner |
| Last modifier | User name of last person to modify the Case |
| Base Template | Template used in creation, if any |
| Case Categories | Set of Case types that the Owner can select from when initiating or editing the case; is predefined for templates, but still can be edited by Owner* |
| Security/access rights* | The security, access rights setting for this user |
| Sharing | Sharing settings for other users; if this user is the Owner, then can be edited |

The user can edit the Title, Description, Owner, Categories, and Security settings. In a multi-user environment, editing these properties is limited to user with Ownership or Authorship status, except for Owner and Security properties, which can only be edited by the Owner or Aeneid Platform Administrator. If the current user is the Owner, then the Sharing settings for other users can be edited. If the user is not the Owner, it is disabled.

Objectives.

The objectives are akin to a list of tasks that the user completes to gather the appropriate information to satisfy a Case. These objectives are represented as a list of items, which are user defined or can be initially from a template. The status for each objective, and set of objectives, is user controlled, and not automated or updated by system.

Each objective has detailed properties associated with it; these properties are set forth in Table 10 below.

TABLE 10

Objective Properties

| Property | Description |
| --- | --- |
| Fulfillment Status | A check box which indicates the task is fulfilled |
| Icon | Iconic representation for the Objective |
| Description | A description of the task up to 250 characters |
| Due Date | The date the task should be completed |
| Status | Selection from a combo box with the following values: Not Started; In Progress; Completed; Waiting on Someone Else; Deferred |
| Priority | Selection of: High; Medium; Low |
| Percentage Complete | 0–100 |
| Owner | One of more Troy users, or Not Assigned |

These fields correspond with the Microsoft Outlook Tasks. The information platform supports the transfer of items to Outlook; this allows the user to see the case tasks in the context of other cases, and tasks which are not information platform tasks. This mitigate the need for a user to see a list of all their cross case objectives within the information platform itself.

The user maintains each of these properties. In a multi-user environment, all users with Ownership or Authorship status can edit these items. The items can be viewed, edited, added, or removed from a Case. The user can also move objectives from one Case to another.

Organizing Objectives.

The user can create folders and sub-folders to organize the Case Objectives.

These are viewed in a hierarchical tree of items, which the user can navigate.

Selection of a folder displays the contained sub-folders and Objectives in the list.

When a sub-folder is displayed in the list, its associated properties are displayed. The properties for an objective folder are shown below in Table 11.

TABLE 11

Objective Folder Properties

| Property | Description |
| --- | --- |
| Fulfillment Status | A check box which indicates that all the objectives within the folder are fulfilled |
| Icon | Iconic representation <folder> |
| Description | A description of the folder up to 250 characters |
| Due Date | <no entry> |
| Status | <no entry> |
| Priority | <no entry> |
| Percentage Complete | <no entry> |
| Owner | <no entry> |

The user can choose to view all the Objectives for a Case, or all the Objectives below a specified level, by right clicking on a level and choosing List All Contained Items (the specific implementation of this is to be determined). The selected folder remains selected, however, the hierarchy control is disabled and the list displays all the items in that folder and all contained sub-folders. The user can re-enable the hierarchy navigation by right clicking on the hierarchy and choosing List This Level Only.

Filtering & Sorting the Objectives.

The display of the Case Objectives uses the Filtering List control. This control allows the user to view a list of items and their associated properties, sort the list in an ascending or descending order based on a selected property, and filter the list on property criteria.

The Case Objectives (see Table 12 below) are listed with their properties. Each property can be used for sorting the list of Objectives and can be used to filter the list.

TABLE 12

Case Objectives

| Property | Logical operators | Filter options |
| --- | --- | --- |
| Fulfillment Status | Is<br>Is not<br>Contains*<br>Starts*<br>Ends*<br>(*text entry only) | Selection of: Fulfilled; Not fulfilled |

TABLE 12-continued

Case Objectives

| Property | Logical operators | Filter options |
| --- | --- | --- |
| Icon | | <no filtering allowed> |
| Description | | Text entry |
| Due Date | | Date entry; fielded entry box <or Selection of: Past Due; Not Yet Due; Due Today; Due Tomorrow; Due This Week> |
| Status | | Selection of: Not Started; In Progress; Completed; Waiting on Someone Else; Deferred |
| Priority | | Selection of: High; Medium; Low |
| Percentage Complete | | Numeric entry of 0–100 <or Selection of: 0%; 0–25%; 26–50%; 51–75%; 76–100%> |
| Owner | | Text entry |

Case Items.

The Case Items are the information items that satisfy the Case Objectives. These items can represent one of two things: a collection item from the Catalog that needs to be fulfilled; or an information item that contains data. The collection items have an unchecked Collection Status property, while the information items have a checked Collection Status. Additionally, there is a different iconic representation for each type of item.

The Case Items are displayed in a list with each item's associated properties. The properties that are associated with a particular Case Item are shown below in Table 13.

TABLE 13

Case Item Properties

| Property | Description |
| --- | --- |
| Collection Status | A check box, indicates if item is collection item or information item (information item is checked); the application manages the status of the item |
| Icon | Iconic representation of the item |
| Name | The name of the Case Item |
| Description | The item description, inherited from the Catalog collection item it was created from |
| Criteria | The criteria for fulfillment |
| Progress | Selection from a combo box with the following values: Collected; In Collection Queue; Waiting for Collection Timing; Deferred; Paused; Partially fulfilled; Error - unable to fulfill. |
| Categories | The selected item categories: for example, financial; press release; corporate; product review. |
| Information Type | Retrieved type of data: document; financial data; table. |
| Input Type | The type of input needed to retrieve: company name; SIC code; product name; product type. |
| Source | The source the information is, or will be, collected from |
| Source Type | The type of source: web site; subscription; local; intranet. |
| Collection Timing | Setting showing when the information is fulfilled, for example: immediate; cheap rate; after 5 PM; weekend. |
| Date & Time | When the item was collected, if fulfilled |
| Author | User who set the collection item or added the information item |

Organizing Case Items.

Case Items can be organized into folders and sub-folders, using the Hierarchy and Filtering List controls. The folders and sub-folders are viewed in a hierarchical tree, which the user can navigate. Selection of a folder displays the contained sub-folders and Items in the list.

When a sub-folder is displayed in the list, its associated properties are displayed. The properties for a Case Item folder are listed below in Table 14.

TABLE 14

Case Item Folder Properties

| Property | Description |
| --- | --- |
| Collection Status | A check box, indicates if items in the folder are all fulfilled; the application manages the status of the item |
| Icon | Iconic representation <folder> |
| Name | The name of the folder |
| Description | <no entry> |
| Criteria | <no entry> |
| Progress | <no entry> |
| Categories | <no entry> |
| Information Type | <no entry> |
| Input Type | <no entry> |
| Source | <no entry> |
| Source Type | <no entry> |
| Collection Timing | <no entry> |
| Date & Time | When the folder's items were completely fulfilled |
| Author | <no entry> |

The user can choose to view all the Items for a Case, or all the Items contained in a specified level, by right clicking on the level and choosing List All Contained Items. The selected folder remains selected and the hierarchy control disables and the list displays all the items in that folder and all contained sub-folders. The user can re-enable the hierarchy navigation by right clicking on the hierarchy control and choosing List This Level Only.

Filtering & Sorting Case Items.

The display of the Case Items uses the Filtering List control. This control allows the user to view a list of items and their associated properties, sort the list in an ascending or descending order based on a selected property, and filter the list on property criteria.

The Case Items are listed with their properties. Each property can be used for sorting the list of Items and can be used to filter the list (see Table 15 below).

TABLE 15

Case Item Properties

| Property | Logical operators | Filter options |
| --- | --- | --- |
| Collection Status | Is<br>Is not<br>Contains*<br>Starts*<br>Ends*<br>(*text only) | Selection of: Collected; Not Collected |
| Icon | | <no filtering> |
| Name | | Text entry |
| Description | | Text entry |
| Criteria | | Text entry |
| Progress | | Selection of: Collected; In Collection Queue; Waiting for Collection Timing; Deferred; Paused; Partially fulfilled; Error - unable to fulfill |
| Categories | | Selection of items' categories, for example: financial; press release; corporate; product review |
| Information Type | | Selection of items' types: document; financial data; table |
| Input Type | | Selection of items' types: company name; SIC code; product name; product type |
| Source | | Text entry |
| Source Type | | Selection of items' types: web site; subscription; local; intranet |
| Collection Timing | | Selection of items' timings: immediate; cheap rate: after 5 pm; weekend |
| Date & Time | | Date entry; fielded entry box |
| Author | | Text entry |

Viewing Case Items.

Case Items are either collection items or information items. Collection items are added from the Catalog or are supplied from the Catalog as part of a Case template. These items have collection criteria associated with them that the user can view and edit. Selecting the Case Item in the list displays the collection criteria for the user to review and edit. These include some of the properties that are associated with the Case Item.

Information items can be items that were added from the Catalog as collection items and are now fulfilled, items that were added directly from information sources while browsing, or items transferred from other Cases. These items have the same properties as the collection items, however, the Status is fulfilled, Progress is collected, and Collection Timing cannot be changed. Selecting the Case Item in the list displays the information that was collected.

Editing Case Items.

The user can edit the Case Item properties as well as the content. When the Case Item represents an unfulfilled collection item, the content is the collection settings. When the Case Item represents a fulfilled information item, the content is the collected data.

Editing Properties.

The user can edit the properties of a Case Item directly in the list control or by selecting the item and choosing Properties from the menu. In the list control, the user can choose a property setting for an item and change its setting. If the property is a free from text entry, the user can select and edit the text. If the property has a limited number of possible settings, those settings can be chosen from a drop down list. If the setting requires complex interaction, the user can choose the setting and click on an ellipse ( . . . ) button to open a dialog to change the settings.

If the user chooses Properties from the menu, the user is presented with a Property Sheet dialog for the item. Within this dialog, the user can change the property settings for the item.

Editing Collection Settings.

If the Case Item is a collection item that has not yet been fulfilled, clicking on it displays the collection settings associated with that item. The user can change the settings and the item is automatically updated. This interaction is the same as when the user first added the item to the Case.

Editing Collected Data.

Once the Case Item has been fulfilled, clicking on it displays the collected information. The user can edit this information directly using in-place activation.

Adding Case Items.

Case Items are added the user from interaction with the Catalog, by selecting New (Case Item from the menu, adding directly from a source, or by copying and pasting from another Case.

Search Items

The Search Items are source searches using the Search Catalog, and are intended to allow the user to perform limited scope searching. Similar to the Case Items, these items can represent one of two things: a search item from the Search Catalog that in the process of fulfillment; or a results item that contains returned search results. The former have an unchecked Completion Status property, while the latter have a checked Completion Status. Each has a different iconic representation.

The Search Items are displayed in a list with each item's associated properties. The properties that are associated with a Search Item are shown in Table 16 below.

TABLE 16

Search Item Properties

| Property | Description |
|---|---|
| Completion Status | A check box, indicates if item is a search item or a search results item (results are checked); the application manages the status of the item |
| Icon | Iconic representation of the item |
| Name | The name of the search item |
| Description | The item description, inherited from the Search Catalog item it was created from |
| Criteria | The criteria for fulfillment |
| Progress | Selection from a combo box with the following values: Collected; In Collection Queue; Waiting for Collection Timing; Deferred; Paused; Partially fulfilled; Error - unable to fulfill. |
| Source | The source(s) the information was, or will be, collected from |
| Source Type | The type(s) of source(s): web site; subscription; local; intranet |
| Search Timing | Setting showing when the information is fulfilled, for example: immediate; cheap rate; after 5 pm; weekend |
| Date & Time | When the search was completed, if fulfilled |
| Author | User who set the collection item or added the information item |

Organizing Search Items.

Search Items can be organized into folders and sub-folders, using the Hierarchy and Filtering List controls. The folders and sub-folders are viewed in the hierarchical tree, which the user can navigate. Selection of a folder displays the contained sub-folders and search items in the list.

When a sub-folder is displayed in the list, its associated properties are displayed. The properties for a search folder are shown in Table 17 below.

TABLE 17

Search Folder Properties

| Property | Description |
|---|---|
| Completion Status | A check box, indicates if item if all contained items are completed; the application manages the status of the item |
| Icon | Iconic representation <folder> |
| Name | The name of the folder or sub-folder |
| Description | <no entry> |
| Criteria | <no entry> |
| Progress | <no entry> |
| Source | <no entry> |
| Source Type | <no entry> |
| Search Timing | <no entry> |
| Date & Time | When the folder search items were all completed |
| Author | <no entry> |

The user can choose to view all the Search Items contained in a specified level and its sub-folder, or all the Search Items in a Case, by right clicking on a folder and selecting View All Contained Items from the pop up menu. The hierarchy control disables and all the items at that level and all contained levels are displayed in the list. The user can right click on the hierarchy control and select List This Level Only to re-enable folder by folder navigation of the items.

Filtering & Sorting Search Items.

The display of the Search Items uses the Filtering List control. This control allows the user to view a list of items and their associated properties, sort the list in an ascending or descending order based on a selected property, and filter the list on property criteria.

The Search Items are listed with their properties (see Table 18 below). Each property can be used for sorting the list of Items and can be used to filter the list.

TABLE 18

Search Items Filtering List Properties

| Property | Logical operators | Filter options |
|---|---|---|
| Completion Status | Is<br>Is not<br>Contains*<br>Starts*<br>Ends*<br>(*text only) | Selection of: Collected; Not Collected |
| Icon | | <no filtering> |
| Name | | Text entry |
| Description | | Text entry |
| Criteria | | Text entry |
| Progress | | Selection of: Collected; In Collection Queue; Waiting for Collection Timing; Deferred; Paused; Partially fulfilled; Error - unable to fulfill |
| Source | | Text entry |
| Source Type | | Selection of source types: web site; subscription; local; intranet |
| Search Timing | | Selection of items' timing: immediate; cheap rate; after 5 pm; weekend |
| Date & Time | | Fielded date entry |
| Author | | Text entry |

Viewing Search Items

Search Items are either search items or results items. Search items are added from the Search Catalog or are supplied from the Search Catalog as part of a Case template. These items have search criteria associated with them that the user can view and edit. Selecting the Search Item in the list displays the search criteria for the user to review and edit. These include all the properties that are associated with the item.

Information items can be items that were added as search items and are now completed or items transferred from other Cases. These items have the same properties as the search items, however, the Completion Status is complete, Progress is collected, and Search Timing cannot be changed. Selecting the Search Item in the list displays the search results that were collected.

Editing Search Items.

The user can edit the Search Item properties as well as the content. When the Search Item represents an incomplete search, the content is the search settings. When the Search Item represents a completed search result, the content is the result.

Editing Properties.

The user can edit the properties of a Search Item directly in the list control or by selecting the item and choosing Properties from the menu. In the list control, the user can choose a property setting for an item and change its setting. If the property is a free from text entry, the user can select and edit the text. If the property has a limited number of possible settings, those settings can be chosen from a drop down list. If the setting requires complex interaction, the user can choose the setting and click on an ellipse ( . . . ) button to open a dialog to change the settings.

If the user chooses Properties from the menu, the user is presented with a Property Sheet dialog for the item. Within this dialog, the user can change the property settings for the item.

Editing Search Settings.

If the Search Item has not been completed and represents search settings, clicking on it displays the item settings. The user can change the settings in the display and the item is automatically updated. The interaction is the same as when the user first added the search item to the Case.

Editing Search Results.

Once the Search Item has been completed, clicking on it displays the result list containing items matching the search criteria at the specified sources. Selecting an item in the list navigates to the source, retrieves and displays the item. The results list can be edited using in-place activation.

Adding Search Items.

Search Items are added the user from interaction with the Search Catalog, by selecting New (Search Item from the menu, or by copying and pasting from another Case.

Case Management.

Through Case management, the user can create Cases and Case templates, view Cases and the associated information, and manipulate Cases.

Case Creation

Users can create new Cases that are blank or from templates that contain preset Case Objectives and, in some instances, Case Items and Search Items to be fulfilled. The user chooses New Case from the menu and the New Case dialog opens. Here the user can choose to create a new blank Case or a new Case from a template.

When the user creates a new blank Case, the properties of the Case are set to the default settings, which the user can edit. The default settings are set forth in Table 19 below.

TABLE 19

Case Creation - Default Settings

| Property | Setting |
| --- | --- |
| Icon | Default Case icon |
| Title | Default Case <1, 2, 3> |
| Description | <none> |
| Date & Time created | Current date & time |
| Date & Time last modified | Current date & time |
| Owner | User name |
| Last modifier | User name |
| Template used in creation | <none> |
| Case categories | <none, unknown> |
| Access rights | User as Owner |
| Sharing | Not shared |

The user can then add Objectives, Case Items, or Search Items, which can be added from the catalogs, directly from sources, or from other Cases. The Case is automatically updated and saved as information is added or fulfilled.

When the user creates a new Case from a template, the Case is created with the specified properties, Objectives, Case Items, and Search Items. The user can then modify these, adding, editing, or removing elements. The user must enter the necessary criteria for fulfillment of the Case Items and Search Items. The Case is then fulfilled according to the settings.

Case Template Creation.

The user can create a blank Case, add Objectives, Case Items, and Search Items, then save the Case as a new template. Additionally, the user can create a Case from a template, modify the Case and also save it as a new template.

If the user opens a fulfilled, or partially fulfilled, Case and attempts to save it as a new template, they are informed that the collection criteria for the Case Items and Search Items are cleared when the Case is saved as a template. The Case is saved as a template and the original Case is retained. The user can also decide if the original Case's Template property should be set to the newly created template.

The Default Case.

The information platform has at least one Case open at all times. The default open Case is the Default Case. This Case is a blank Case that does not have a specified set of Objectives, Case Items, nor Search Items. The user can add information to the Case while interacting with the product.

The property settings for this Case are initially set as shown in Table 20 below.

TABLE 20

Initial Case Property Settings

| Property | Setting |
| --- | --- |
| Icon | Default Case icon |
| Title | Default Case <1, 2, 3> |
| Description | <none> |
| Date & Time created | Current date & time |
| Date & Time last modified | Current date & time |
| Owner | User name |
| Last modifier | User name |
| Template used in creation | <none> |
| Case categories | <none, unknown> |
| Access rights | User as Owner |
| Sharing | Not shared |

The Default Case can be considered a session by session workspace that is stored according to its properties when the user exits the application. This is analogous to a word processor default document that is automatically saved as the user interacts with it. The user can collect and review information in the Default Case, opening and closing it like any other Case. The user can change the title of the Case at any time from "Default Case <#>" to a more descriptive and informative title.

In a multi-user environment, the Default Cases are unique to each user; however, the information can be shared in the same manner as any other Case.

Active Case(s).

As described, the information platform has at least one Case open at all times. The user can open other Cases and move information between Cases by copying and pasting from Case to Case. It is useful for the user to be able to have more than one active Case open at the same time. This facilitates moving information from one Case to another, as well as comparing information in different Cases.

Manipulating Cases.

In addition to creating Cases as described above, the user can open, edit, save, share, export and delete cases.

Opening Cases.

To open a Case, the user goes to the Open Case dialog and selects a Case from among the Cases available to that user according to their access privileges. These Cases may reside locally or on a server, and the user is able to see all of their Cases as well as Cases of others that have been shared.

Cases are organized into folders and sub-folders which the user can navigate (multi-user: is the organization specific to the user, "my view", or generic for all users). For a selected folder, any contained sub-folders and Cases are displayed in list with the associated properties.

Filtering the Case Hierarchy

The user can filter the entire Case hierarchy within the context of the Open Case dialog. The dialog contains a global filtering set with which the user can filter the hierarchical tree of Cases by setting one or more filters. The user can filter Cases as shown in Table 21 below.

TABLE 21

Filtering Cases

| Property | Logical operators | Filter options |
|---|---|---|
| Title | Is<br>Is not<br>Contains*<br>Starts*<br>Ends*<br>(*text only) | Text entry |
| Description | | Text entry |
| Case Objectives contain | | Text entry |
| Case Items contain | | Text entry |
| Search Items contain | | Text entry |
| Date & time created | | Date entry; fielded entry |
| Date & time last modified | | Date entry; fielded entry |
| Owner | | Text entry |
| Last modifier | | Text entry |
| Base Template | | Selection of existing templates <or text entry box> |
| Case Category | | Selection from categories list |
| Access rights | | Selection from user access rights: Owner; Author; Reviewer; Read-only |
| Sharing | | Text entry |

When the user sets a filter criteria, the display of available Cases are limited to the items that match the criteria. The hierarchy of Case folders and sub-folders is limited to paths that contain matches, and the list is limited to the matching items. The user can use the filtering in the Cases list to further limit the listing of Cases. If the user sets a filter for a property on the global level, however, that setting overrides that property's setting on the Case list level. The filter at the Case list level inherits the setting for the global filter and is disabled.

Filtering & Sorting the Case List

The properties of each Case is displayed using the Filtering List control. The user can sort the list of Cases by property setting by selecting a property column or filter the list based on property settings. The properties that are displayed in the Case list are shown in Table 22 below.

TABLE 22

Case List Properties

| Property | Description |
|---|---|
| Icon | Iconic representation for the Case <may be different for shared, user is owner, user is author> |
| Title | Title for Case, user defined |
| Description | User defined text |
| Date & time created | |
| Date & time last modified | |
| Owner | User name of current Case owner |
| Last modifier | User name of last person to modify the Case |
| Base Template | Template used in creation, if any |
| Case Categories | Set of Case types that the Owner can select from when initiating or editing the case |
| Security/access rights | The security, access rights setting for this user |
| Sharing | If the Case is shared, with whom |

Selecting a column sorts the list by that property. The user can change the order between ascending and descending. The columns can be reordered by clicking and dragging, and each column can be changed to display any of the available properties.

The user can filter the list by setting a filter for one or more of the property columns. Each filter narrows the displayed list to entries that match all the filter settings. The filter options for each property are shown in Table 23 below.

TABLE 23

Filter Options

| Property | Logical operators | Filter options |
|---|---|---|
| Icon | Is<br>Is not<br>Contains*<br>Starts*<br>Ends*<br>(*text only) | <no filtering> |
| Title | | Text entry |
| Description | | Text entry |
| Date & time created | | Date entry; fielded entry box |
| Date & time last modified | | Date entry; fielded entry box |
| Owner | | Text entry |
| Last modifier | | Text entry |
| Base Template | | Text entry |
| Case Categories | | Selection from categories list |
| Security/access rights | | Selection from user access rights: Owner; Author; Reviewer; Read-only |
| Sharing | | Text entry |

The user can choose a Case to open from the list of Cases. The settings for location, searching, sorting, and filtering of the Case display in the Open Case dialog are retained across sessions. Each time the user opens the dialog, it defaults to the last open location and settings.

Editing & Saving Cases.

Once a Case has been opened, the user can modify its properties, add or remove Objectives, Case Items, and Search Items, review information. As the Case is modified and information is added or removed, the Case is automatically stored.

The user can choose Save As to create a new Case or Case template from an old Case. The old Case continues to exist if new Cases or templates are created from it. If the user saves as a new Case, they are prompted to give it a new title. If the user creates a template from a Case, they are informed that the collection criteria for the Case Items and Search Items are cleared when the Case is saved as a template. The Case is saved as a template and the original Case is retained. The user can also decide if the original Case's Template property should be set to the newly created template.

Information (Objectives, Case Items, and Search Items) can be moved between Cases in one of two ways. First, if there is the ability to open more than one Case at a time, the user drags and drops between the two Cases. Second, the user can copy information from one Case, open a second Case, and paste the information into it.

Case Notification.

If a Case is in the process of fulfillment, it is helpful to allow the user to have the information platform send notification to the user on changes in the Case status. This notification includes Case Item fulfillment, Search Item fulfillment, progress indicators, or error notices. Notification occurs through dialog, Taskbar tray items, or active desktop elements.

Sharing Cases.

The user can share Cases with other users by setting the Sharing property of the Case. Only the user that is the Owner of the Case can set this property. This user can set which other users to share the Case with, and set each user's access rights.

Exporting Cases.

An entire Case can be exported as a file containing the Objectives, Case Items, Search Items and properties. In addition to the full Case, a Case Summary (or Snapshot) can be viewed and exported. This includes the Case properties, Objectives, Case Item list, Search Item list, and source bibliography.

Catalog Control

The Catalog control is one of the ways that the user can add information data items to a Case. There are two sets of information retrieval collections that can be viewed in the Catalog control: the Information Catalog; and the Search Catalog.

The Information Catalog consists of a set of references to known information resources. These can be viewed by one of three taxonomic settings: by various business language topics and subtopics; by source; and by input type. The items in the Information Catalog refer to internal and external sources: local drives; servers; Intranets; the Internet; and subscription information services. The information items that are retrieved from these resources represent a range, from compilations of several documents (potentially from various locations) down to a single data item within a document. The Information Catalog items can also refer to stored document geometry information to parse subdocument information during the item's retrieval process. When the user adds items from the Information Catalog to a Case, they become Case Items (collection items to be fulfilled).

The Search Catalog consists of a set of references to known internal and external sources that can be searched. These can be viewed by one of three taxonomic settings: by topics and subtopics; by source; and by input type. The user can use the Search Catalog to do limited scope searches, searching specific sets of sources for information matching search criteria. The results that are retrieved from these sources are result lists that link to information items at various sources. One search result list may contain references to information from various sources. When the user adds items from the Search Catalog to a Case, they become Search Items.

Catalog Navigation

The Catalog control consists of two controls: a hierarchical view of the selected catalog based on the taxonomic setting; and a list of the associated Catalog items on a selected level. The hierarchical view of the information space allows the user to traverse the folders and sub-folders based on a selected taxonomic scheme. When the user selects a folder, the sub-folders and individual items at that level are displayed along with their properties in the list view. Given that the items can often be categorized by more than one topic, some items are accessible from multiple topics and subtopics.

The user can navigate the hierarchy by expanding and collapsing the folders and sub-folders, with the selected level's sub-folders and items displayed in an accompanying list. The Hierarchy and Filtering List controls are used to display this information. These controls allow the user to filter the hierarchy and list based on item properties, as well as view all the items below a specified level.

Changing Catalog View

The Catalog can be changed to display either the Information Catalog or the Search Catalog. The user selects which catalog to display from the drop down selection, the hierarchy display updates to show the correct information space. If the user has set filters on the global or list level in the previous view for properties that are also in the new view, they persist in the new view. If a filter is set for a property that is not in the current view, then the filter setting is discarded.

Choosing a Taxonomy.

The user can choose to view the Catalog by one of several taxonomies. The taxonomic views that are available for each catalog are Topics, Sources, and Input Types. Choosing a view changes the hierarchical display to reflect the choice. The Catalog items are reorganized to reflect the new hierarchy, but function in the same manner.

Filtering the Catalog

The user can filter the entire Catalog hierarchy by setting global filters. The Catalog control contains a set of filters that affect the hierarchy and listing. The user can filter the Catalog by the properties shown on Table 24 below.

TABLE 24

Catalog Filtering Properties

| Property | Logical operators | Filter options |
|---|---|---|
| Topic Name | Is<br>Is not<br>Contains*<br>Starts*<br>Ends*<br>(*text only) | Text entry |
| Item Name | | Text entry |
| Description | | Text entry |
| Category | | Select from item category list: financial; product review; stock quote; corporate; media |
| Source | | Text entry |
| Source type | | Select from type list: web site; local file; local database; subscription; intranet |
| Input type | | Select from list: company name; ticker symbol; SIC code; product name; product type; person's name |
| Retrieved information type | | Select from list: document; table; numeric; text |
| Date last accessed | | Date entry; fielded entry box |

When the user sets filter criteria for a property, the Catalog hierarchy is limited to paths that contain matching items and the list is limited to matching items. The user can use filtering in the Catalog Items list to further limit the listed items; however, the global filtering settings override the list level settings. If a filter has been set on the global level, then the corresponding filter on the list level inherits the setting and is disabled.

Catalog Items Listing

When the user chooses a topic or subtopic in the Catalog hierarchy, the contained subtopics and catalog items are displayed in the catalog list. This list uses the Filtering List control, allowing the user to filter and sort the displayed items. The list displays the items and their associated properties, the Catalog item properties are as shown in Table 25 below.

TABLE 25

Catalog Item Properties

| Property | Description |
| --- | --- |
| Icon | Iconic representation for item |
| Name | Item name |
| Description | Textual description of the item |
| Category | Identifying categories, some user defined: financial; product review; stock quote; corporate; media |
| Source | The source(s) for the item; names or ARLs |
| Source type | The defined source types for the associated sources: web site; local file; local database; subscription; intranet |
| Input type | The type of input required to collect information: company name; ticker symbol; SIC code; product name; product type; person's name |
| Retrieved information type | The format of the collected information: document; table; numeric; text |
| Date last accessed | The date the user last retrieved information using this collection item |

If subtopics are contained in the selected topic, then its displayed properties are a shown on Table 26 below.

TABLE 26

Sub-Topic Properties

| Property | Description |
| --- | --- |
| Icon | Iconic representation for item <folder> |
| Name | Subtopic name |
| Description | Textual description of the subtopic |
| Category | <no entry> |
| Source | <no entry> |
| Source type | <no entry> |
| Input type | <no entry> |
| Retrieved information type | <no entry> |
| Date last accessed | <no entry> |

Filtering & Sorting the Catalog Listing

The properties for each Catalog item are displayed using the Filtering List control. By selecting a property header in the list, the user can sort the list of displayed items by that property. The user can set to sort in an ascending or descending order. The list of displayed items can be filtered by one or more properties by setting filter criteria. The properties and associated filter criteria entry controls are as shown in Table 27 below.

TABLE 27

Filtering List Control Properties

| Property | Logical operators | Filter options |
| --- | --- | --- |
| Icon | Is<br>Is not<br>Contains*<br>Starts*<br>Ends*<br>(*text only) | <no filtering> |
| Name |  | Text entry |
| Description |  | Text entry |
| Category |  | Selection from item categories: financial; product review; stock quote; corporate into; media |
| Source |  | Text entry |
| Source type |  | Selection from types: web site; local file, local database; subscription; CD; intranet |
| Input type |  | Selection from types: company name; SIC code; product type; product name; person's name |
| Retrieved information type |  | Selection from types: document; table; numeric; text |
| Date last accessed |  | Date entry; fielded entry box |

Selecting Catalog Items

Selecting a collection item in the Information Catalog list displays the information retrieval settings for that item. The user can enter retrieval criteria and add the item to the Active Case as a Case Item. Selecting a search item from the Search Catalog list displays the search settings for that item. The user can enter the search criteria and settings, then add the item to the Active Case as a Search Item.

Information Catalog Retrieval.

Each Information Catalog item allows the user to enter criteria and settings to collect information from one or more sources.

Collection Settings.

Assigning to a case;

Naming case items;

Entering criteria; using combinations of open ended entry, user sets, prior retrieval results; and Settings; when to retrieve, priority.

Search Catalog Retrieval.

Each Search Catalog item allows the user to enter criteria and settings to search the sources for matching items.

Collection Settings.

Assigning to a case;

Naming search items;

Entering criteria; using combinations of open ended entry, user sets, prior retrieval results; and Settings; when to search, priority.

Catalog Editing.

Each Catalog item allows the user to enter criteria and settings to collect information from one or more sources.

Adding an internal source to the catalog;

Adding external sources to the catalog;

Copy or move nodes;

Changing relationships;

Creating user defined views; and

Synchronizing catalogs; with administrator, with other user, with updates.

Document Analyzer Control.

The Document Analyzer control allows the user to view the fundamental structure of a data item, which may be a document, paragraph, table, or even word or numeric, and manipulate the structural elements.

Document Display.

Display of the data item;

Display of the selected elements; and

Choosing to export, edit, manipulate each of the displays.

Views.

Viewing all elements; and

Viewing only specified elements; i.e. paragraphs, tables, quotes, financial data, names.

Document Representation.

Graphical representation of the data item;

Selectable elements within representation; paragraph, table, cell, graphic; and

Multiple selection capable.

Full Geometry.

Hierarchical breakdown of data items; and

Tight integration between full geometry listing and graphical representation is necessary.

Changing Granularity.

The user can change the level of granularity of the view;

Zoom in and out to breakdown a smaller or larger piece of the data item; and

Each element within the representation should be exportable and manipulatable by the user.

User Sets Control.

The User Sets control allows the user to store frequently used case item collection criteria. For example, the user can store a set of competitive companies that can then be used in data retrieval as a group.

Display of User Sets.

Hierarchical listing of sets and entries; and

Entry item types; names, document types, codes, numerics.

Managing User Sets.

Creating user sets; by hand, from results;

Adding items to a set;

Editing sets;

Sharing sets, import, export, updates from administration; and

Duplicating sets.

User Sets in Data Retrieval.

Drag and drop sets or items to the collection entry fields; and

Matching and enabling of sets that can be used in a known entry field type.

Favorites Control.

The Favorites control allows the user to save bookmarks to favorite locations for quick access. The Favorites control functions in the same manner as the Favorites items in the Windows OS. In fact, the favorites may be integrated with the Explorer Favorites, selection opening the client application instead of Explorer. Also, the system's Favorites could be integrated into the client, as there is no location that can be added to the system Favorites that cannot be viewed through the client.

Display of Favorites.

Hierarchical listing of items; and

Properties available; i.e. name, URUARL, type.

Management of Favorites.

Adding an item to the favorites;

Moving, copying, deleting items;

Arranging favorites into groups; and

Viewing favorites by type.

Printing

The user is able to print information items, Catalog items, Cases, Case Items, and Search Items.

Print information items.

Print the active or selected information items, can be navigated item (such as web site, local document), Case items, or retrieved Search items.

Print Case information.

Print the entire Case (title, properties, objectives, items list, item information);

Print a subset of the Case, Case Summary; and

Print Case elements: Properties; Objectives; Case Items; Search Items.

Document Display

The client displays various documents and other data elements. These items can consist of Case elements, desktop documents, local network items, Intranet or Internet items.

Document Viewing.

View data elements in an integrated manner; e.g. html, doc, xls, txt, pdf, java, ActiveX.

Document Editing.

Use desktop applications, such as Word, Excel, or Notepad, to edit and manipulate data elements while integrated into the client; and Editing an item; edit the original, copy, prompt to save.

Exporting

Export to location;

Export formats; and

Export to other tools, report applications, Aeneid report templates.

Catalog Synchronization

A master catalog is maintained which contains all of the information sources, access scripts, and parsing rules. The catalog references volatile document sources, and must be updated on a frequent basis. It is anticipated that the catalog will be updated with a frequency ranging from daily to monthly. Information platform customers modify their copy of the catalog. The system must synchronize the two sets and produce a new catalog that retains both parties' modifications.

Terminology.

Basic catalog entries fall into three categories:

Items: specific entries that define a single data nugget, e.g. CEO's Total Compensation.

Classifiers: catalog entries that provide a way of subdividing other catalog entries; they are analogous to folders. In some situations, the user may be able to instruct the system to collect a classifier—the system collects all of the Items who are direct or indirect children of the classifier.

Package: similar to classifiers, but used to retrieve sets of information. Collections behave as items (in as much as they are leaf nodes) but are pointers to items and classifiers.

A catalog entry refers to a single node in the catalog, which may be of any of the above three types. An information platform entry is a catalog entry originating from the master catalog. A customer entry is a catalog item originated by a customer.

User Defined Entries.

Table 28 below identifies the supported and restricted catalog modifications.

TABLE 28

| Catalog Modifications | | |
|---|---|---|
| Category | Operation | Comments |
| Allowable Modifications | Description Edits | An authorized user may change the title of a catalog entry, the description of a catalog entry, or the entry's keywords. The system maintains the official descriptions, and any user is optionally able to display them. |
| | Add New Entries | New entries may be added provided the parent(s) is not fixed (discussed below). |
| | Entry Deletion | A user may delete any entry that is non-fixed. The item is not actually deleted; it is marked as deleted and not displayed. |
| | Undeletion | The catalog has a recycle bin where user deleted entries are displayed. A user can undelete items from the recycle bin. |

TABLE 28-continued

Catalog Modifications

| Category | Operation | Comments |
|---|---|---|
| | Add Output Parameters | A user may add output parameters to the master set, and add them to the information platform or customer entry |
| | Add Document Types | A user may add document types to the master set, and add them to an information platform or customer entry |
| | Copy Entries to Other Catalog Areas | |
| Restricted Modifications | Edits to restricted entries | The catalog supports "fixed structure" sections which are designed to emulate a vendors classic menu structure, e.g. Gartner Classic menu. If an item is marked as "fixed", no changes may be made to the item, and no children may be added to it. A fixed item, however, may be edited to point to additional parents. |
| | Script Changes | A user may not modify the script or input parameters of any information platform entry. |

Catalog Entry IDs and Flags

Every catalog entry must have a unique ID. This ensures that the synchronization engine can find a users modified copy of an item, even when it has been moved to another part of the tree.

All catalog entries have a flag indicating whether the item is an official entry (originating from the master catalog), or whether the user created the item.

All catalog entries have a flag indicating whether the user edited the item. This allows the synchronization engine to rapidly replace entries where no modifications have been made.

All catalog entries have a flag indicating whether the item is deleted, and a date/time field indicating the time of deletion.

Change Management

The synchronization task for a catalog is potential lengthy, especially for a catalog with 10,000 plus entries and more than 1000 changes, for example. One way to optimize the synchronization task, is to maintain a list or log of all modifications to the catalog. A transaction list is then distributed to customer sites, rather than the entire catalog.

The transaction list sent to a customer contains only the net changes since the time of last update. If a catalog entry was deleted and subsequently undeleted, there is no entry in the transaction log because the second operation nullifies the first. Similarly, it the title of a catalog entry is changed three times, only one entry is made in the transaction list: the identification of the current title. This process of deriving net changes is referred to as transaction condensing.

A condensed list would be generated by the system by taking all the transactions since the last time the customer catalog was updated. The transaction log records the operations as shown in Table 29 below.

TABLE 29

Transaction Log

| OPERATION | DATA |
|---|---|
| Change an entry's title | New title |
| Change an entry's description | New description |
| Change an entry's keywords | New keywords |
| Change an entry's mutable status | New state |
| Add an entry | Entry details |
| Delete an entry | N/A |
| Delete a parent | Parent OID |
| Add a parent | Parent OID |

All transactions include the OID of the affected entry and the date/time of the modification. Thought must be given to the order of transaction execution. For example, an object cannot be assigned a new parent until the new parent entry has been added.

There is a chance that the transaction log gets corrupted. An algorithm can take two versions of the catalog, and create a condensed transaction log such that if the transactions are applied to the earlier version of the catalog, an identical copy of the newer version is created. Conversely, if a catalog becomes corrupted a prior version of the catalog could be restored, and all transactions since that data could be executed to rebuild the latest version.

Parsing/Scrubbing Kernal

Introduction.

A primary feature of the information platform is the parsing engine, which is responsible for interpreting the format of a stream of information and then returning requested elements (or blocks) to the caller. The Parsing Kernal (PK) does not perform any direct IO of the source document; it is passed the document (as a UNICODE stream) to analyze and, upon request, returns structure information or content.

Document Geometry.

One of the primary functions of the PK is to read the source document and determine the page geometry. This geometry subdivides a document into the elements shown in Table 30 below.

TABLE 30

Document Elements

| Classification | Element | Description |
|---|---|---|
| Document | Section | The first level subdivision of a document. In the case of HTML it may be identified by <H1> tags, for spreadsheets it is each tab, and for word files the "Heading 1" style. |
| | Sub Section | Subdivisions of a section identified by lower level headings in HTML and Word, or by outline in Excel. |
| | Paragraph | A standard paragraph of text. A bulletted list is also classified as a paragraph. Paragraphs contain sub-elements as described below. |
| | Table | A collection of one or more rows and one or more columns. Tables contain sub-elements as described below |
| | Image | A embedded binary image, OLE container, or a link to another document. |
| Paragraph | Sentence | Self explanatory |
| | Phrase | Self explanatory |
| | Word | Self explanatory |

TABLE 30-continued

Document Elements

| Classification | Element | Description |
|---|---|---|
| Table | Title | The table's title |
| | Column | A column of cells |
| | Row | A row of cells |
| | Col Header | The topmost cell or cells of a column identifying the column contents. |
| | Spanned Col Header | A column header which spans two or more columns. |
| | Row Header | The left most cell of a row identifying the row contents. |
| | Spanned Row Header | A row header which spans multiple rows. |
| | Cell | The contents of a cell may be any other major element. A cell for example, may contain another table or a whole document. |
| Special | Link | An HREF to another document, or another part of this document. |
| | Form | A collection of one or more input fields or buttons. |
| | Line | A logical line of content, based on a default or specified display format. |
| Range | NA | A bounded collection of elements (discussed below) |

Element Coordinates.

One of the main goals of the PK is to take a document stream and return some element on collection of elements. An element can be identified by its ordinal position, or by searching for some specific content and pattern matching.

Ordinal Identification.

This method involves finding an element by its position within the document or subdocument. Table 31 shows the ordinal ways an element can be identified.

TABLE 31

Ordinal Identification

| Category | Examples |
|---|---|
| Position within Document: an element's ordinal value within all the elements of the same type. | $3^{rd}$ paragraph<br>$23^{rd}$ line<br>$2^{nd}$ table<br>Last image<br>$4^{th}$ URL |
| Position within Owning Element: an element's ordinal value within all the elements of the same type found in a parent element. | $3^{rd}$ row of a table<br>$2^{nd}$ sentence of a paragraph<br>Last phrase of a sentence<br>$2^{nd}$ cell of a row of a table |
| Position from Anchor Element: an element's ordinal value within all the elements of the same type starting from a specified point. | $3^{rd}$ paragraph following the $2^{nd}$ table<br>$2^{nd}$ line of the third table following the subsection sales.<br>Note: the anchor element might be specified ordinally, or by pattern matching |

Pattern Identification.

This method involves locating an element by finding a specific string or pattern within the content. At the heart of the string matching routines is a regular expression search engine. Regular expressions (regex for short) are character strings in which plain text indicates that that text must exist in the target string, and special characters are used to indicate what variability is allowed in the target strings. By using a regex engine (or a subset of the de facto regex tokens), the search engine can satiate almost any search request. Table 32 below shows the pattern based ways an element can be identified.

TABLE 32

Pattern Identification

| Category | Examples |
|---|---|
| Simple Content Match: looks for a sub-string on regex expression in the document and returns the primary document and returns the primary document element containing the match | Return the first paragraph in a document which contains the text 'Peter Coffee'. |
| Bounded Content Match: Similar to simple content match, but the search scope is limited to one contiguous part of the document. | Return the paragraph inside section 2 which contains a dollar value. Return the row of table (with the title Earnings) containing the value 1997 |
| Simple/Bounded Content Match In Element Type: A bounded or document wide search looking for a sub-string within a specific element type, e.g. paragraph or table. | Return the first table which has a title of "Earnings"<br>Return the first link which has www.microsoft.com in the HREF and an TARGET parameter of main. |

Note that pattern identification may result in multiple matches, and the parsing system should provide ways to iterate through the matches, as well as return the Nth match.

Content Range.

One contiguous span of information in a document is referred to as a range. Ranges are identified by specifying the beginning and ending elements. The bounding elements can be defined using any of the coordinate specification techniques identified above.

Interfaces.

The parsing subsystem is implemented as an ActiveX COM object with interfaces that support the following operations:

Set source stream

Set/get operation bounds (passing begin and ending element coordinates or ids)

Get source stream in specific format (pass desired format type)

Get document tree structure (passing handle to a window tree control)

Get element stream (passing element coordinates, or ID) Note: This function takes care of most block retrieval functions, e.g. get paragraph, get sentence, get cell, get row Get element ID (passing element coordinates)

Get element count (passing element type)

Get first element stream (passing pattern based element coordinates, optional element type)

Get next element stream

Get last element stream

Get table size (passing element coordinates or ID)

Get header coordinates (passing table coordinates/ID plus col/row of header)

Parsing Classes

CBlock: High level blocks such as sections, subsections, paragraphs, tables, images, and sentences, with methods to access different kind of information about them and methods to create a fully structured HTML document.

CHtmlParse: Has a container of virtual and non-virtual HTML tags and methods to access different kind of structured information about them. This class takes the input stream which is either structured, quasi-structured, or non-structured HTML or Text document and creates the container of the tags and provides the methods to access the information and to create a new HTML structured document.

CTextParse: This class takes as an input a segment of a stream document which has no structured information and creates a container of virtual tags and structured information about the stream segment. The container has tables, rows, columns, table cells, table headers, paragraphs, section, and subsection headers, and page numbers. Hyper-text links may be added.

CParag: This class takes a segment of unstructured text that ends with a blank line or end of document and converts it to HTML by deciding if it should be a table, section header, subsection header, paragraph, or page number.

CLine: This class takes one line of unstructured text and creates a list of phrases in it with information about the phrases. It also provides a line calculator to be able to merge two lines together if needed, or compare lines together to see if they line up in a table, to decide if the line is a header row.

CPhrase: This class takes one phrase of unstructured text and provides information about such as if it is alpha, alphanumeric, punctuation, upper case, and where it starts and ends in terms of characters and column cells. It also provides a phrase calculator to merge phrases, compare phrases.

CTag: This class is used to create an HTML tag structure with information about the attributes of the tag. It is used to create HTML code from the container of the blocks.

CHtmlTags: This class is used to provide the latest syntax of the HTML language with its attributes. It is used in the parsing of the HTML documents and in the creation of the structured HTML streams.

Figure 9:
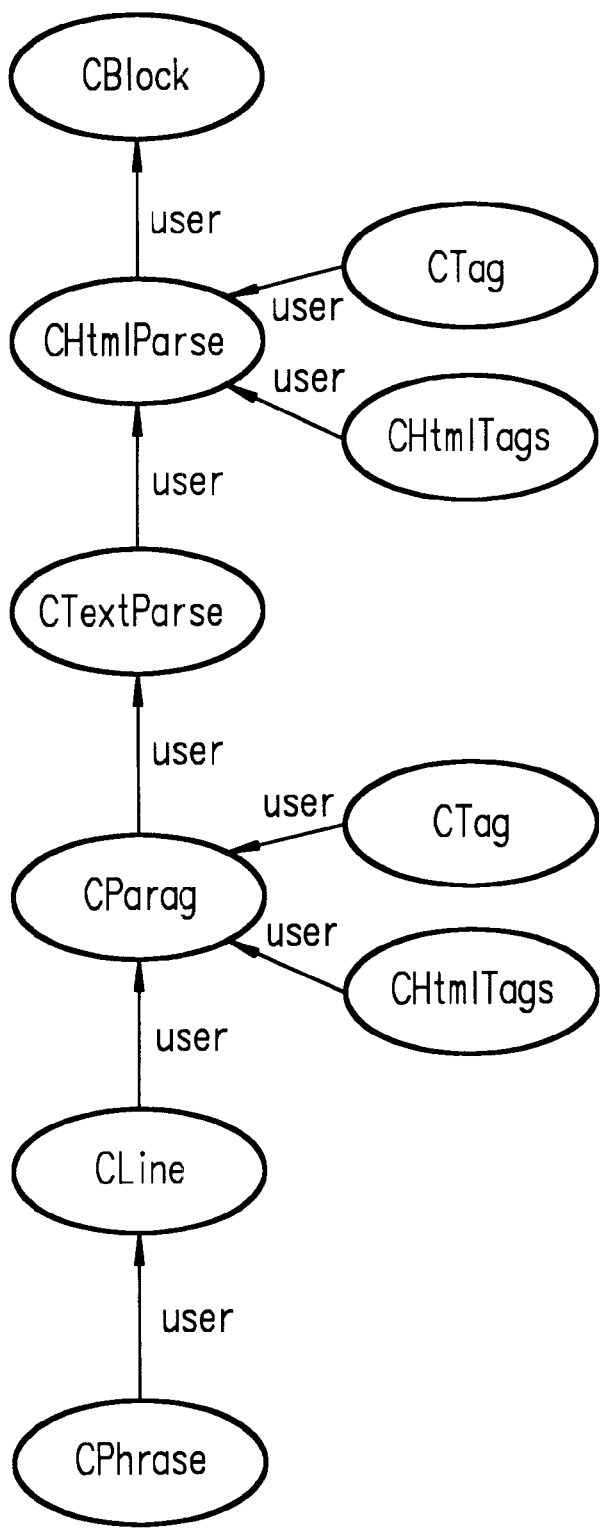
FIG. 9 is a flow diagram of information platform parser showing the relationship of the parsing classes according to the invention.

FIG. 9 is a flow diagram of information platform parser showing the relationship of the above identified parsing classes.

Parsing Sequence

Figure 10:
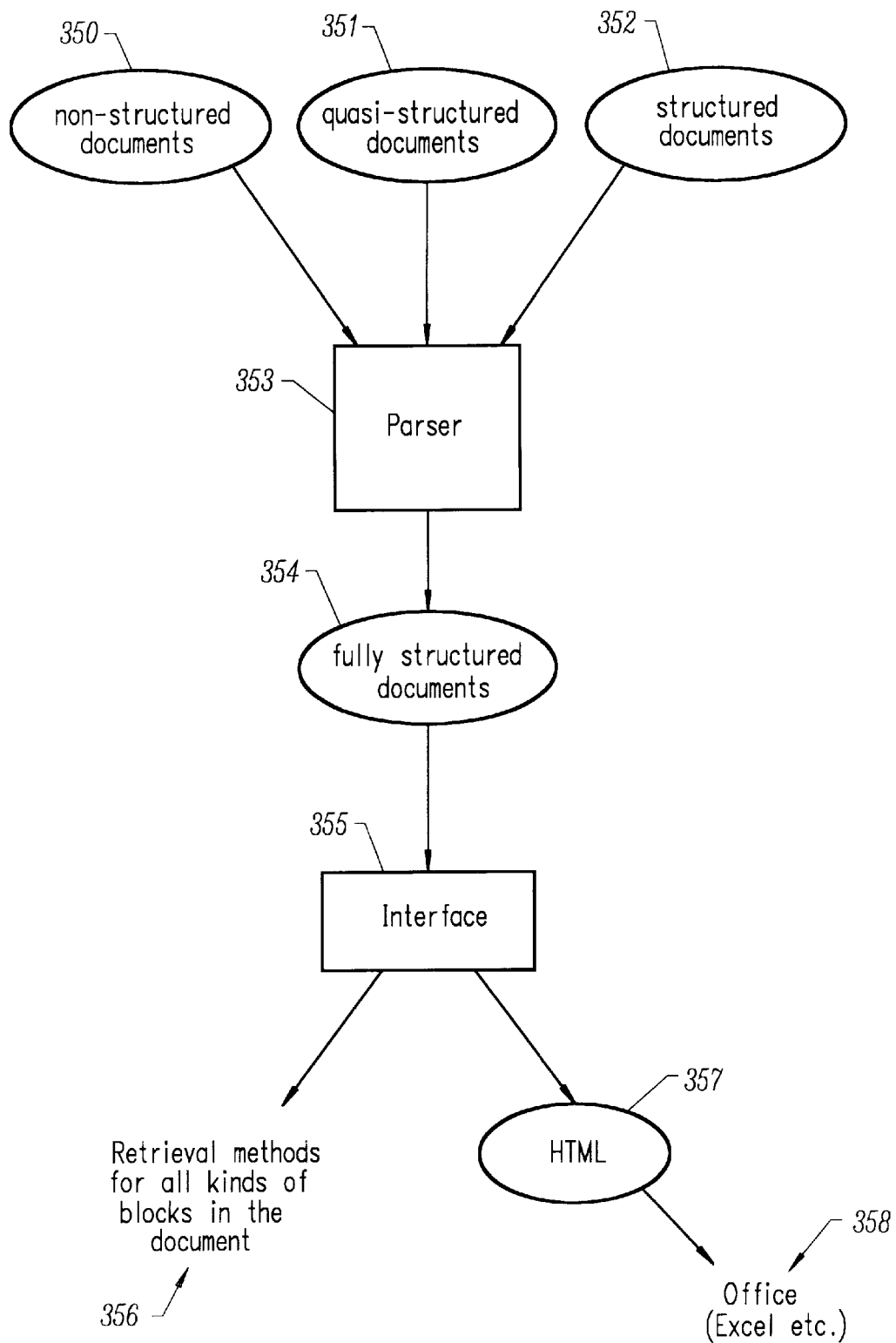
FIG. 10 is a block diagram of information platform parser operation according to the invention.

FIG. 10 is a block diagram of information platform parser according to the invention. A Unicode document which is either fully structured HTML document 352, quasi-structured HTML document 351, or unstructured text document 350 is passed to the parser 353. A fully structured document is produced 354 that is provided via an interface 355 to either be applied to retrieval methods for all of the various types of blocks in the document 356 or the document is formatted as HTML 357 and passed to an application, such as Microsoft Office 358.

Figure 11:
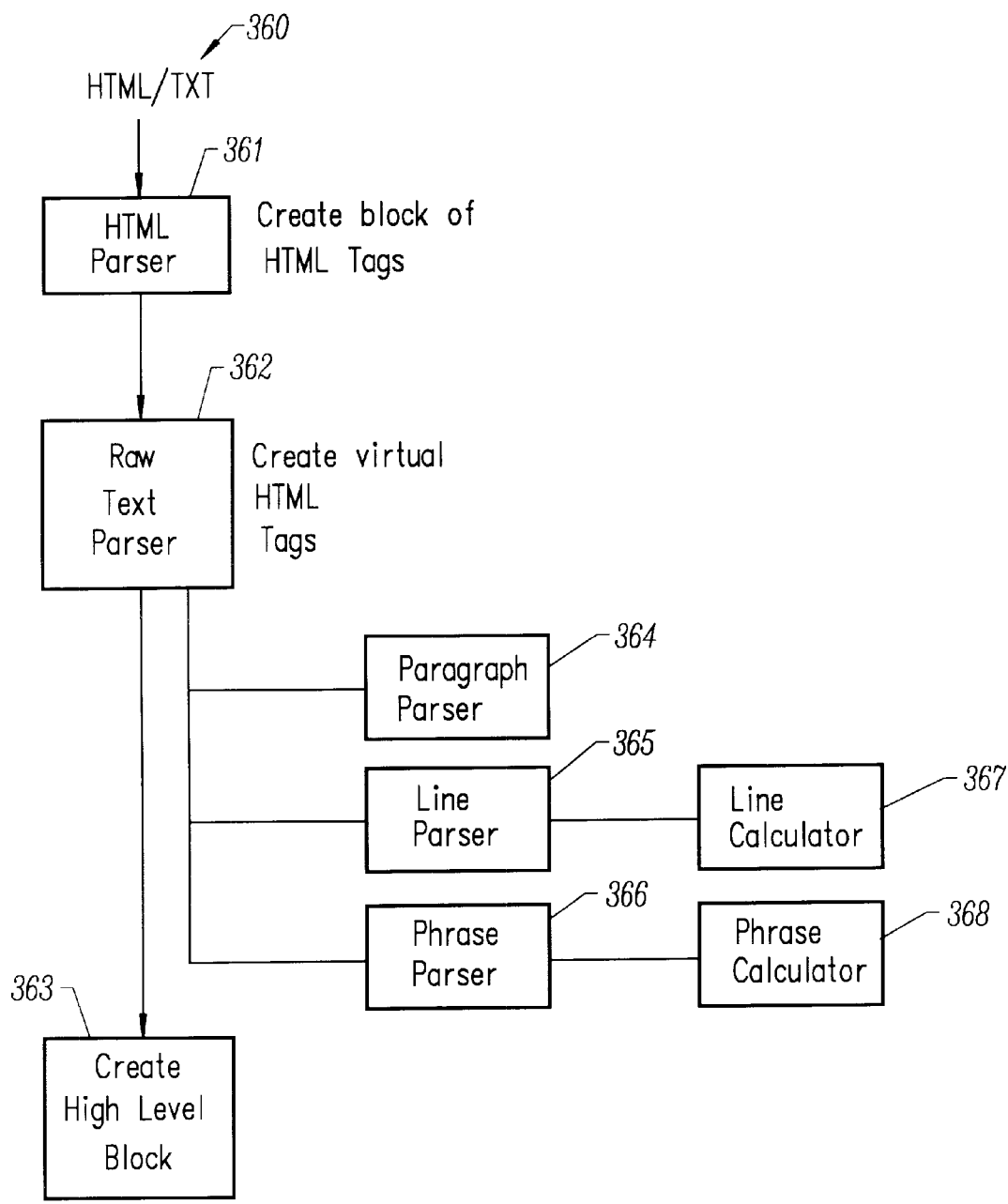
FIG. 11 is a more detailed block diagram of the information platform parser operation of FIG. 10.

FIG. 11 is a more detailed block diagram of the information platform parser of FIG. 10. The discussion below is provided in connection with an HTMUtext parser. It should be appreciated the discussion herein is for purposes of example and that the invention is not limited to just the example provided in connection with FIGS. 10 and 11.

In operation:

The parser 361 finds all the HTML tags in the documents.

The parser finds the HTML tags starting and ending points in the document, including those that their optional ends do not exist.

The parser identifies the HTML tags that have structural information such as paragraphs, tables, rows, list items.

For text segment that has raw text or text with HTML tags that have no structural information such as bold, call the Text Parser 362. The segment could be one or more paragraphs.

The Text Parser divides the segment into paragraphs and then parses each paragraph using the paragraph parser.

The paragraph parser 364 studies the lines of the paragraph using the Line Parser 365 and decides if the paragraph is simply a regular text paragraph, header, page number, table.

The Line Parser divides the line into phrases and calls the Phrase Parser 366 to get info about each phrase.

The Paragraph parser then uses the Line and Phrase calculators 367, 368 to identify the possible structure of the paragraph; if it is a table, it creates an HTML table from it dealing with all kinds of raw text tables that are not necessarily lining up or have all elements in each row.

The Paragraph Parser generates virtual HTML tags and returns a list of such tags to the Text Parser.

The Text Parser combines all the virtual HTML tags from all the parsed paragraphs and then passes them back to the HTML Parser.

The HTML Parser creates one container for all the virtual and non-virtual HTML tags and enumerates all the tags properly in the document. For instance, all rows are numbered within a table. All row elements are numbered within a table.

A list 363 of high level blocks is created from these virtual and non-virtual HTML tags. These blocks resemble sections, subsections, paragraphs, tables, images, sentences.

An Active-X interface allows the client to retrieve a generated fully structured HTML document of the original one. It also allows the client to retrieve information about any block in the document using regular expressions. The retrieved data may be requested as text only or as HTML.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. An information platform for performing data collection, interpretation and analysis, comprising:
    a data retrieval module comprising:
        a catalog including a data store for collecting internal and external information from relevant sources;
        a geometry recognition module for analyzing multiple sources and recognizing particular patterns within each source; and
        a page analyzer for scanning a source document, breaking said source document into blocks and sub-blocks of information, and returning granular pieces for aggregation in said data store;
    a data classification and storage module;
    an information browsing, query, analysis, and report creation module said information browsing, query, analysis, and report creation module comprising:
        a classification subsystem for classifying data according to a specific language, wherein said classification allows said data to be archived and tracked in an object store, and wherein said classification allows said object store to manage complex relationships between a plurality of items whereby, once classified, an item is associated to several other data types by any of one or more characteristics; and
    a desktop integration module.

2. The information platform of claim 1, wherein said classification subsystem uses object-oriented meta data technology.

3. The information platform of claim 1, wherein said information browsing, query, analysis, and report creation module comprises:
    visualization controls that include any of a time-span slider bar to allow for comparisons of data over time; a population quadrant to compare data frequency across multiple axis; and a cross tabular chart to analyze information.

4. An information platform for performing data collection, interpretation and analysis, comprising:
a data retrieval module comprising:
a catalog including a data store for collecting internal and external information from relevant sources; and
a parsing engine for interpreting the format of a stream of information and then returning requested elements to a user by reading a source document and determining said source document page geometry, wherein said parsing engine locates an element by finding a specific string or pattern within a source document, where regular expressions are character strings in which plain text indicates that that text must exist in a target string, and special characters are used to indicate what variability is allowed in said target strings, and wherein said parsing engine performs any of:
a simple content match which looks for a sub-string on regular expression in said source document and returns a primary document element containing the match;
a bounded content match in which the search scope is limited to one contiguous part of said source document; and
a simple/bounded content match in element type which is a bounded or document wide search that look for a sub-string within a specific element type; and
a data classification and storage module; and
an information browsing, query, analysis, and report creation module.

5. The information platform of claim 4, wherein said parsing engine subdivides a source document into elements at include any of a section, a sub-section, a paragraph including any of a sentence, phrase, and word; a table including any of a title, column, row, column header, spanned column header, header, row header, spanned row header, and cell; an image, a link, form, and a line, optionally within a range.

6. The information platform of claim 4, wherein said parsing engine identifies an element by either of its ordinal position and by searching for specific content and pattern matching.

7. The information platform of claim 4, wherein said parsing engine parses one contiguous span of information in a source document that is identified by specifying beginning and ending elements, wherein said specified elements can be defined using any coordinate specification techniques.

8. The information platform of claim 7, wherein said parsing engine further comprises:
a parsing subsystem is implemented as an object with interfaces that support any of the following operations:
Set source stream;
Set/get operation bounds (passing begin and ending element coordinates or ids);
Get source stream in specific format (pass desired format type);
Get document tree structure (passing handle to a window tree control);
Get element stream (passing element coordinates, or ID);
Get element ID (passing element coordinates);
Get element count (passing element type);
Get first element stream (passing pattern based element coordinates, optional element type);
Get next element stream;
Get last element stream;
Get table size (passing element coordinates or ID; and
Get header coordinates (passing table coordinates/ID plus col/row of header).

9. The information platform of claim 8, wherein said parsing subsystem further comprises any of the following parsing classes:
CBlock which parses high level blocks with methods to access different kind of information about them and methods to create a fully structured document;
CHtmlParse which has a container of virtual and non-virtual HTML tags and methods to access different kind of structured information about them and where an input stream which is either structured, quasi-structured, or non-structured HTML or Text document is used to create a container of tags and provide methods to access information and to create a new HTML structured document;
CTextParse which takes as an input a segment of a stream document which has no structured information and creates a container of virtual tags and structured information about said stream segment where said container has any of tables, rows, columns, table cells, table headers, paragraphs, section, and subsection headers, and page numbers and where hyper-text links may be added;
CParag which takes a segment of unstructured text that ends with a blank line or end of document and converts it to HTML by deciding if it should be a table, section header, subsection header, paragraph, or page number;
CLine which takes one line of unstructured text and creates a list of phrases in it with information about the phrases and which also provides a line calculator to be able to merge two lines together if needed, or compare lines together to see if they line up in a table, to decide if the line is a header row;
CPhrase which takes one phrase of unstructured text and provides information about it and where it starts and ends in terms of characters and column cells and which also provides a phrase calculator to merge phrases, compare phrases;
CTag which creates an HTML tag structure with information about the attributes of a tag and which is used to create HTML code from the container of the blocks; and
CHtmlTags which provides the latest syntax of the HTML language with its attributes and which is used in the parsing of HTML documents and in the creation of structured HTML streams.

10. A method for performing data collection, interpretation and analysis, in an information platform, said method comprising the steps of:
finding tags starting and ending points in a source document;
identifying tags that have structural information;
providing a text parser for a text segment that has raw text or text with tags that have no structural information;
dividing said segment into paragraphs with said text parser;
parsing each paragraph using a paragraph parser, wherein said paragraph parser studies the lines of a paragraph using a line parser and decides if said paragraph is a regular text paragraph, header, page number, or table, wherein said line parser divides a line into phrases and calls a phrase parser to get information about each phrase, wherein said paragraph parser then uses line and phrase calculators to identify the structure of said paragraph; wherein if said paragraph is a table, said paragraph parser creates a table; wherein said paragraph parser generates virtual tags and returns a list of such tags to said text parser;

combining all of said virtual tags from all of said parsed paragraphs with said text parser and then passing said virtual tags back to an HTML parser;

creating one container for all the virtual and non-virtual tags with said HTML parser and enumerating all the tags properly in said source document; and creating a list of high level blocks from said virtual and non-virtual tags;

wherein a user can retrieve a generated, fully structured document of said source document; and wherein said user can retrieve information about any block in said source document using regular expressions.

11. An apparatus for performing data collection, interpretation and analysis, in an information platform, comprising:

a parse engine for finding tags starting and ending points in a source document and for identifying tags that have structural information;

a text parser for a text segment that has raw text or text with tags that have no structural information; said text parser dividing said segment into paragraphs; and a paragraph parser for parsing each paragraph;

wherein said paragraph parser studies the lines of a paragraph using a line parser and decides if said paragraph is a regular text paragraph, header, page number, or table, wherein said line parser divides a line into phrases;

wherein said paragraph parser calls a phrase parser to get information about each phrase;

wherein said paragraph parser then uses line and phrase calculators to identify the structure of said paragraph;

wherein if said paragraph is a table, said paragraph parser creates a table;

wherein said paragraph parser generates virtual tags and returns a list of such tags to said text parser;

wherein said text parser combines all of said virtual tags from all of said parsed paragraphs and then passes said virtual tags back to an HTML parser;

wherein said HTML parser creates one container for all the virtual and non-virtual tags, enumerates all the tags properly in said source document, and creates a list of high level blocks from said virtual and non-virtual tags;

wherein a user can retrieve a generated, fully structured document of said source document; and wherein said user can retrieve information about any block in said source document using regular expressions.

* * * * *